(12) United States Patent
Li et al.

(10) Patent No.: US 12,375,909 B2
(45) Date of Patent: Jul. 29, 2025

(54) KEY IDENTIFIER GENERATION METHOD AND RELATED APPARATUS

(71) Applicant: Huawei Technologies Co., Ltd., Shenzhen (CN)

(72) Inventors: He Li, Shanghai (CN); Rong Wu, Shenzhen (CN); Yizhuang Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 173 days.

(21) Appl. No.: 18/348,834

(22) Filed: Jul. 7, 2023

(65) Prior Publication Data
US 2023/0362636 A1 Nov. 9, 2023

Related U.S. Application Data

(63) Continuation of application No. PCT/CN2021/070980, filed on Jan. 8, 2021.

(51) Int. Cl.
*H04L 29/06* (2006.01)
*H04W 12/041* (2021.01)
(Continued)

(52) U.S. Cl.
CPC ..... *H04W 12/041* (2021.01); *H04W 12/0433* (2021.01); *H04W 12/06* (2013.01)

(58) Field of Classification Search
CPC .......... H04W 12/041; H04W 12/0433; H04W 12/06
See application file for complete search history.

(56) References Cited

U.S. PATENT DOCUMENTS 11,172,426 B2 * 11/2021 Chaponniere ........... H04W 8/22
11,991,518 B2 *  5/2024 De Kievit ............. H04W 12/06
(Continued)

FOREIGN PATENT DOCUMENTS

CN    111147421 A    5/2020
TW    201946485 A   12/2019
(Continued)

OTHER PUBLICATIONS

3rd Generation Partnership Project; Technical Specification Group Services and System Aspects; Security architecture and procedures for 5G system (Release 17), 3GPP TS 33.501, Dec. 2020, 253 pages, V17.0.0.
(Continued)

*Primary Examiner* — Shawnchoy Rahman
(74) *Attorney, Agent, or Firm* — Slater Matsil, LLP

(57) ABSTRACT

An authentication management function AUSF receives an authentication request message from an access and mobility management function AMF, where the authentication request message carries a subscription concealed identifier SUCI. The AUSF sends an authentication vector get request message to a unified data management UDM function, where the authentication vector get request message carries the SUCI. The AUSF receives an authentication vector get response message from the UDM, where the authentication vector get response message includes authentication and key management for application AKMA indication information. The AUSF generates, based on the AKMA indication information, an authentication and key management for application-key identifier based on a routing indicator RID in the SUCI.

20 Claims, 10 Drawing Sheets

(51) Int. Cl.
  *H04W 12/0433* (2021.01)
  *H04W 12/06* (2021.01)

(56) References Cited

U.S. PATENT DOCUMENTS

| | | | |
|---|---|---|---|
| 2019/0174449 A1 | 6/2019 | Shan et al. | |
| 2021/0273879 A1* | 9/2021 | Kumar | H04W 76/19 |
| 2021/0392495 A1* | 12/2021 | Tsiatsis | H04W 12/40 |
| 2022/0046412 A1* | 2/2022 | Choyi | H04W 12/06 |
| 2022/0386130 A1* | 12/2022 | Choyi | H04L 63/0892 |
| 2023/0262463 A1* | 8/2023 | Kunz | H04L 63/1475 455/410 |

FOREIGN PATENT DOCUMENTS

| | | | | |
|---|---|---|---|---|
| WO | 2020093864 A1 | | 5/2020 | |
| WO | 2020098974 A1 | | 5/2020 | |
| WO | WO-2020088026 A1 | * | 5/2020 | ........... G06F 21/575 |

OTHER PUBLICATIONS

3GPP TS 23.003 V17.0.0 (Dec. 2020), 3rd Generation Partnership Project; Technical Specification Group Core Network and Terminals; Numbering, addressing and identification; (Release 17), 142 pages.

ZTE, "Clarification of RID in the clause 6.1", 3GPP TSG-SA3 Meeting#101e, S3-202901, e-meeting, Nov. 9-20, 2020, 3 pages.

3GPP TS 23.501 V16.7.0 (Dec. 2020),3rd Generation Partnership Project; Technical Specification Group Services and System Aspects; System architecture for the 5G System (5GS); Stage 2 (Release 16), 450 pages.

3GPP TS 23.502 V16.7.0 (Dec. 2020), 3rd Generation Partnership Project; Technical Specification Group Services and System Aspects; Procedures for the 5G System (5GS); Stage 2 (Release 16), 603 pages.

3GPP TS 29.509 V17.0.0 (Dec. 2020), 3rd Generation Partnership Project; Technical Specification Group Core Network and Terminals; 5G System; Authentication Server Services; Stage 3 (Release 17), 61 pages.

3GPP TS 33.501 V15.11.0 (Dec. 2020), 3rd Generation Partnership Project; Technical Specification Group Services and System Aspects; Security architecture and procedures for 5G system (Release 15), 193 pages.

3GPP TS 33.535 V17.0.0 (Dec. 2020), 3rd Generation Partnership Project; Technical Specification Group Services and System Aspects; Authentication and Key Management for Applications (AKMA) based on 3GPP credentials in the 5G System (5GS) (Release 17), 20 pages.

Dekok, A. et al., "The Network Access Identifier", Internet Engineering Task Force (IETF), Request for Comments 7542, May 2015, 30 pages.

* cited by examiner

KEY IDENTIFIER GENERATION METHOD AND RELATED APPARATUS

CROSS-REFERENCE TO RELATED APPLICATIONS

This application is a continuation of International Application No. PCT/CN2021/070980, filed on Jan. 8, 2021, the disclosure of which is hereby incorporated by reference in its entirety.

TECHNICAL FIELD

This application relates to the field of communication technologies, and in particular, to a key identifier generation method and a related apparatus.

BACKGROUND

With rapid development of network technologies, network security becomes an increasingly prominent issue. With development of a 5th generation (5G) mobile communication, an authentication and key management for application (AKMA) procedure may be used between user equipment (UE) and an application server (AF) currently. In the AKMA procedure, an authentication management function (AUSF) sends an authentication vector get request message (Numd_UEAuthentication Get Request) to a unified data management (UDM) function. The authentication vector get request message carries a permanent identifier (SUPI) or a subscription concealed identifier (SUCI), and the authentication vector get request message is used to trigger a primary authentication procedure between the UE and a network side (a core network).

Whether the authentication vector get request message carries the SUPI or the SUCI is based on an authentication vector request message received by the AUSF. When the authentication request message carries the SUPI, the authentication vector get request message carries the SUPI. When the authentication request message carries the SUCI, the authentication vector get request message carries the SUCI.

In the AKMA procedure, the AUSF needs to generate an AKMA-key identifier (A-KID). The A-KID is also referred to as an authentication and key management for application-key identifier. Currently, it is specified that the A-KID needs to be generated based on a routing indicator (RID). The routing indicator is defined in the standard TS 23.003. Specifically, the routing indicator may be used for selection of the AUSF or the UDM. The RID is a part of the SUCI, and the SUPI does not include the RID. Therefore, when the authentication request message carries the SUPI, the AUSF cannot obtain the RID. Consequently, the AUSF cannot generate the A-KID, and the AKMA procedure fails.

SUMMARY

According to a first aspect, an embodiment of this application provides a key identifier generation method, including: An authentication management function receives an authentication request message #1 from an access and mobility management function, where the authentication request message #1 carries a subscription concealed identifier, and the subscription concealed identifier is a subscription concealed identifier generated based on a permanent identifier of a terminal device. The authentication management function sends an authentication vector get request message #1 to a unified data management function, where the authentication vector get request message #1 carries the subscription concealed identifier. The authentication management function receives an authentication vector get response message #1 from the unified data management function, where the authentication vector get response message #1 includes indication information of authentication and key management for application. Based on the indication information of authentication and key management for application, the authentication management function generates an authentication and key management for application-key identifier #1 based on a routing indicator in the subscription concealed identifier. The authentication management function stores the routing indicator.

Specifically, the subscription concealed identifier (SUCI) may be understood as an encrypted form of the permanent identifier (SUPI). For example, refer to section 6.12.2 in 3GPP TS 33.501 and section 2.2B in TS 23.003. Specifically, the SUCI may include the routing indicator and an encrypted part. The encrypted part is encrypted user identity information. In a possible implementation, the encrypted part may be obtained by performing encryption calculation on a part other than a mobile country code (MCC) in the SUPI using a universal subscriber identity module (USIM) card or a mobile equipment (mobile equipment, ME).

The authentication request message #1 is "Nausf_UEAuthentication_Authenticate Request".

The indication information of authentication and key management for application is also referred to as AKMA service indication information in embodiments of this application. The AKMA service indication information may be "AKMA Indication" or "AKMA ID". This is not limited in embodiments of this application. The AKMA service indication information indicates that the AUSF needs to generate an AKMA anchor key Kakma and a corresponding key identifier (for example, an authentication and key management for application-key identifier) for UE. It may also be understood as follows: The AKMA service indication information indicates that the UE supports an AKMA service.

The UDM sends the RID again to ensure that the AUSF has an available RID.

In embodiments of this application, in an AKMA procedure, the authentication management function AUSF stores a parameter related to the RID (for example, the SUCI, the authentication and key management for application-key identifier A-KID, and/or the RID), to ensure that the AUSF can generate, when the authentication vector get request message received by the AUSF carries the SUPI, a new A-KID by using the parameter related to the RID, thereby ensuring that the AKMA procedure is successfully performed.

In a possible implementation, the method further includes: The authentication management function receives an authentication request message #2 from the access and mobility management function. When the authentication request message #2 carries the permanent identifier, the authentication management function generates a new authentication and key management for application-key identifier #2 by using the stored routing indicator. Specifically, the AUSF determines an intermediate key Kausf based on the SUPI, and generates the A-KID #2 by using Kausf. The AUSF can generate a new A-KID based on the stored RID when receiving the SUPI, to ensure that the AKMA service of the UE is successfully performed.

In a possible implementation, that the authentication management function generates an authentication and key management for application-key identifier #1 based on a routing indicator in the subscription concealed identifier includes: The authentication management function generates an authentication and key management for application-key identifier based on an intermediate key generated in an authentication procedure for the terminal device. The authentication management function splices the routing indicator and the authentication and key management for application-key identifier, to obtain the authentication and key management for application-key identifier #1.

Specifically, the generating the A-KID based on the RID is specifically as follows: A format of the A-KID is "username@example". The "username" part includes the routing indicator and the authentication and key management for application-temporary UE identifier (AKMA Temporary UE Identifier, A-TID). The "example" part includes a home network identifier, for example, a mobile country code (MCC) and a mobile network code (MNC). The A-TID is a temporary identifier generated based on Kausf.

In a possible implementation, that the authentication management function stores the routing indicator includes: The authentication management function stores the authentication and key management for application-key identifier #1. In conventional technologies, after generating the authentication and key management for application-key identifier #1, the authentication management function sends the generated authentication and key management for application-key identifier #1 to another network element (for example, an authentication and key management for application anchor function), and then deletes the generated authentication and key management for application-key identifier #1. Because the A-KID includes the routing indicator, the authentication management function may still generate a corresponding A-KID for the terminal device when subsequently receiving a SUPI-based authentication vector request message, to ensure the AKMA procedure is successfully performed.

In a possible implementation, the authentication vector get response message #1 further includes the routing indicator. That the authentication management function generates an authentication and key management for application-key identifier #1 based on a routing indicator in the subscription concealed identifier includes: The authentication management function generates the authentication and key management for application-key identifier #1 based on the routing indicator in the authentication vector get response message #1. The AUSF may generate the authentication and key management for application-key identifier #1 based on the routing indicator in the authentication vector get response message #1, thereby improving implementation flexibility of the solution.

In a possible implementation, that the authentication management function stores the routing indicator includes: The authentication management function stores the subscription concealed identifier, thereby improving implementation flexibility of the solution.

In a possible implementation, after that the authentication management function stores the routing indicator, the method further includes: The authentication management function deletes the authentication and key management for application-key identifier #1. After storing the routing indicator, the AUSF may further delete the authentication and key management for application-key identifier #1, to save storage space of the AUSF.

In a possible implementation, after that the authentication management function generates an authentication and key management for application-key identifier #2 based on the stored routing indicator, the method further includes: The authentication management function deletes the authentication and key management for application-key identifier #2. The authentication management function continues to store the routing indicator. After generating the authentication and key management for application-key identifier #2 based on the stored routing indicator, the AUSF may further delete the authentication and key management for application-key identifier #2, to save storage space of the AUSF. The AUSF may further continue to store the routing indicator, to ensure that the AKMA service is successfully performed.

According to a second aspect, an embodiment of this application provides a key identifier generation method, including: An authentication management function receives an authentication request message #1 from an access and mobility management function, where the authentication request message #1 carries a subscription concealed identifier, and the subscription concealed identifier is a subscription concealed identifier generated based on a permanent identifier of a terminal device. The authentication management function sends an authentication vector get request message #1 to a unified data management function, where the authentication vector get request message #1 carries the subscription concealed identifier. The authentication management function receives an authentication vector get response message #1 from the unified data management function, where the authentication vector get response message #1 includes indication information of authentication and key management for application and a routing indicator in the subscription concealed identifier. Based on the indication information of authentication and key management for application, the authentication management function generates an authentication and key management for application-key identifier #1 based on the routing indicator.

In embodiments of this application, in an AKMA procedure, the AUSF may obtain the RID from the UDM, to ensure that the AUSF can generate, when the authentication vector get request message received by the AUSF carries a SUPI, a new A-KID by using the RID, thereby ensuring that the AKMA procedure is successfully performed.

In a possible implementation, the method further includes: The authentication management function receives an authentication request message #2 from the access and mobility management function, where the authentication request message #2 includes the permanent identifier. The authentication management function sends an authentication vector get request message #2 to the unified data management function, where the authentication vector get request message #2 carries the permanent identifier. The authentication management function receives an authentication vector get response message #2 from the unified data management function, where the authentication vector get response message #2 includes the routing indicator. The authentication management function generates a new authentication and key management for application-key identifier #2 by using the routing indicator. In embodiments, the AUSF may obtain the routing indicator from the UDM, thereby improving implementation flexibility of the solution.

In a possible implementation, the method further includes: The authentication management function receives an authentication request message #2 from the access and mobility management function, where the authentication request message #2 includes the permanent identifier. The authentication management function sends an authentication vector get request message #2 to the unified data management function, where the authentication vector get request message #2 carries the permanent identifier. The authentication management function obtains the routing indicator from a core network element based on the indication information of authentication and key management for application. The authentication management function generates a new authentication and key management for application-key identifier #2 by using the routing indicator. In embodiments, the AUSF may obtain the routing indicator from another core network element, to ensure that an AKMA service is successfully performed, thereby improving implementation flexibility of the solution.

In a possible implementation, that the authentication management function obtains the routing indicator from another core network element based on the indication information of authentication and key management for application includes: The authentication management function determines, based on the indication information of authentication and key management for application, that the authentication and key management for application-key identifier #2 needs to be generated. When the authentication management function does not have the routing indicator locally, the authentication management function obtains the routing indicator from the core network element.

Specifically, the AUSF further detects whether the AUSF locally stores a parameter related to the RID (for example, the RID, the SUCI, and/or the A-KID). When a detection result is that the authentication request message #2 does not have the RID (or the authentication request message #2 does not have the RID, and the AUSF does not have the parameter related to the RID locally), the AUSF obtains the routing indicator from the core network element.

Optionally, the core network element includes the unified data management function or the access and mobility management function.

In embodiments, when the AUSF does not have the routing indicator locally, the AUSF obtains the routing indicator from another core network element, to ensure that the AKMA service is successfully performed, thereby improving implementation flexibility of the solution.

In a possible implementation, before that the authentication management function obtains the routing indicator from a core network element based on the indication information of authentication and key management for application, the method further includes: The authentication management function receives an authentication vector get response message #2 from the unified data management function, where the authentication vector get response message #2 includes the indication information of authentication and key management for application. When the AUSF receives the indication information of authentication and key management for application, the AUSF can determine that UE supports the AKMA service. Therefore, the AUSF obtains the routing indicator from the core network element only after that, to avoid a waste of signaling.

According to a third aspect, an embodiment of this application provides a key identifier generation method, including: An authentication management function receives an authentication request message #1 from an access and mobility management function, where the authentication request message #1 carries a subscription concealed identifier, and the subscription concealed identifier is a subscription concealed identifier generated based on a permanent identifier of a terminal device. The authentication management function sends an authentication vector get request message #1 to a unified data management function, where the authentication vector get request message #1 carries the subscription concealed identifier. The authentication management function receives an authentication vector get response message #1 from the unified data management function, where the authentication vector get response message #1 includes indication information of authentication and key management for application. Based on the indication information of authentication and key management for application, the authentication management function generates an authentication and key management for application-key identifier #1 based on a routing indicator in the subscription concealed identifier. The authentication management function receives an authentication request message #2 from the access and mobility management function, where the authentication request message #2 includes the permanent identifier and the routing indicator. The authentication management function generates a new authentication and key management for application-key identifier #2 by using the routing indicator received from the access and mobility management function.

In embodiments of this application, in an AKMA procedure, if the AMF determines that UE supports an AKMA service, the AUSF may obtain the RID from the AMF, to ensure that the AUSF can generate, when the authentication vector get request message received by the AUSF carries a SUPI, a new A-KID by using the RID, thereby ensuring that the AKMA procedure is successfully performed.

In a possible implementation, before that the authentication management function generates a new authentication and key management for application-key identifier #2 by using the routing indicator received from the access and mobility management function, the method further includes: The authentication management function sends an authentication vector get request message #2 to the unified data management function, where the authentication vector get request message #2 carries the permanent identifier. The authentication management function receives an authentication vector get response message #2 from the unified data management function. In embodiments, the AMF may include the RID in the authentication request message, and the AUSF obtains the RID from the authentication request message, thereby improving implementation flexibility of the solution.

In a possible implementation, before that the authentication management function receives an authentication request message #2 from the access and mobility management function, the method further includes: The authentication management function sends a first authentication request response to the access and mobility management function. The first authentication request response includes first indication information, and the first indication information indicates that the terminal device supports an authentication and key management for application service. In embodiments, the AUSF may further notify, based on other indication information (the first indication information), the AMF that the UE supports the AKMA service, thereby improving implementation flexibility of the solution.

In a possible implementation, the authentication vector get response message #1 further includes the routing indicator. That the authentication management function generates an authentication and key management for application-key identifier #1 based on a routing indicator in the subscription concealed identifier includes: The authentication management function generates the authentication and key management for application-key identifier #1 based on the routing indicator in the authentication vector get response message #1. In embodiments, the AUSF may further generate the authentication and key management for application-key identifier #1 by using the RID in the authentication vector get response message #1 from the AMF, thereby improving implementation flexibility of the solution.

According to a fourth aspect, an embodiment of this application provides a key identifier generation method, including: An authentication management function receives an authentication request message #2 from an access and mobility management function, where the authentication request message #2 includes a permanent identifier. The authentication management function sends an authentication vector get request message #2 to a unified data management function. The authentication vector get request message #2 carries the permanent identifier. The authentication management function receives an authentication vector get response message #2 from the unified data management function, where the authentication vector get response message #2 includes indication information of authentication and key management for application. The authentication management function determines, based on the indication information of authentication and key management for application, that an authentication and key management for application-key identifier needs to be generated. When the authentication management function does not have a routing indicator locally, the authentication management function obtains the routing indicator from a core network element. The authentication management function generates an authentication and key management for application-key identifier #2 by using the routing indicator.

Specifically, the AUSF further detects whether the AUSF locally stores a parameter related to the RID (for example, the RID, the SUCI, and/or the A-KID). When a detection result is that the authentication request message #2 does not have the RID (or the authentication request message #2 does not have the RID, and the AUSF does not have the parameter related to the RID locally), the AUSF obtains the routing indicator from the core network element.

Optionally, the core network element includes the unified data management function or the access and mobility management function.

In embodiments of this application, in an AKMA procedure, the AUSF may obtain the RID from the core network element such as a UDM or an AMF, to ensure that the AUSF can generate, when the authentication vector get request message received by the AUSF carries a SUPI, a new A-KID by using the RID, thereby ensuring that the AKMA procedure is successfully performed.

According to a fifth aspect, an embodiment of this application provides a communication apparatus, including:
  a transceiver module, configured to receive an authentication request message #1 from an access and mobility management function, where the authentication request message #1 carries a subscription concealed identifier, and the subscription concealed identifier is a subscription concealed identifier generated based on a permanent identifier of a terminal device, where
  the transceiver module is further configured to send an authentication vector get request message #1 to a unified data management function, where the authentication vector get request message #1 carries the subscription concealed identifier; and
  the transceiver module is further configured to receive an authentication vector get response message #1 from the unified data management function, where the authentication vector get response message #1 includes indication information of authentication and key management for application; and
  a processing module, configured to generate, based on the indication information of authentication and key management for application, an authentication and key management for application-key identifier #1 based on a routing indicator in the subscription concealed identifier, where
  the processing module is further configured to store the routing indicator.

In a possible implementation, the transceiver module is further configured to receive an authentication request message #2 from the access and mobility management function.

The processing module is further configured to: when the authentication request message #2 carries the permanent identifier, generate a new authentication and key management for application-key identifier #2 by using the stored routing indicator.

In a possible implementation, the processing module is further configured to generate an authentication and key management for application-key identifier based on an intermediate key generated in an authentication procedure for the terminal device.

The processing module is further configured to splice the routing indicator and the authentication and key management for application-key identifier, to obtain the authentication and key management for application-key identifier #1.

In a possible implementation, the processing module is further configured to store the authentication and key management for application-key identifier #1.

In a possible implementation, the authentication vector get response message #1 further includes the routing indicator.

That the processing module is further configured to generate the authentication and key management for application-key identifier #1 based on the routing indicator in the subscription concealed identifier includes:

The processing module is further configured to generate the authentication and key management for application-key identifier #1 based on the routing indicator in the authentication vector get response message #1.

In a possible implementation, the processing module is further configured to store the subscription concealed identifier.

In a possible implementation, the processing module is further configured to delete the authentication and key management for application-key identifier #1.

In a possible implementation, the processing module is further configured to delete the authentication and key management for application-key identifier #2.

The processing module is further configured to continue to store the routing indicator.

According to a sixth aspect, an embodiment of this application provides a communication apparatus. The communication apparatus includes:
  a transceiver module, configured to receive an authentication request message #1 from an access and mobility management function, where the authentication request message #1 carries a subscription concealed identifier, and the subscription concealed identifier is a subscription concealed identifier generated based on a permanent identifier of a terminal device, where
  the transceiver module is further configured to send an authentication vector get request message #1 to a unified data management function, where the authentication vector get request message #1 carries the subscription concealed identifier; and
  the transceiver module is further configured to receive an authentication vector get response message #1 from the unified data management function, where the authentication vector get response message #1 includes indication information of authentication and key management for application and a routing indicator in the subscription concealed identifier; and a processing module, configured to generate, based on the indication information of authentication and key management for application, an authentication and key management for application-key identifier #1 based on the routing indicator.

In a possible implementation, the transceiver module is further configured to receive an authentication request message #2 from the access and mobility management function. The authentication request message #2 includes the permanent identifier.

The transceiver module is further configured to send an authentication vector get request message #2 to the unified data management function. The authentication vector get request message #2 carries the permanent identifier.

The transceiver module is further configured to receive an authentication vector get response message #2 from the unified data management function. The authentication vector get response message #2 includes the routing indicator.

The processing module is further configured to generate a new authentication and key management for application-key identifier #2 by using the routing indicator.

In a possible implementation, the transceiver module is further configured to receive an authentication request message #2 from the access and mobility management function. The authentication request message #2 includes the permanent identifier.

The transceiver module is further configured to send an authentication vector get request message #2 to the unified data management function. The authentication vector get request message #2 carries the permanent identifier.

The transceiver module is further configured to obtain the routing indicator from a core network element based on the indication information of authentication and key management for application.

The processing module is further configured to generate a new authentication and key management for application-key identifier #2 by using the routing indicator.

In a possible implementation, the processing module is further configured to determine, based on the indication information of authentication and key management for application, that the authentication and key management for application-key identifier #2 needs to be generated.

The transceiver module is further configured to: when the authentication management function does not have the routing indicator locally, obtain the routing indicator from the core network element.

In a possible implementation, the core network element includes the unified data management function or the access and mobility management function.

In a possible implementation, the transceiver module is further configured to receive an authentication vector get response message #2 from the unified data management function. The authentication vector get response message #2 includes the indication information of authentication and key management for application.

According to a seventh aspect, an embodiment of this application provides a communication apparatus. The communication apparatus includes:

a transceiver module, configured to receive an authentication request message #1 from an access and mobility management function, where the authentication request message #1 carries a subscription concealed identifier, and the subscription concealed identifier is a subscription concealed identifier generated based on a permanent identifier of a terminal device, where the transceiver module is further configured to send an authentication vector get request message #1 to a unified data management function, where the authentication vector get request message #1 carries the subscription concealed identifier; and the transceiver module is further configured to receive an authentication vector get response message #1 from the unified data management function, where the authentication vector get response message #1 includes indication information of authentication and key management for application; and a processing module, configured to generate, based on the indication information of authentication and key management for application, an authentication and key management for application-key identifier #1 based on a routing indicator in the subscription concealed identifier, where the transceiver module is further configured to receive an authentication request message #2 from the access and mobility management function, where the authentication request message #2 includes the permanent identifier and the routing indicator; and the processing module is further configured to generate a new authentication and key management for application-key identifier #2 by using the routing indicator received from the access and mobility management function.

In a possible implementation, the transceiver module is further configured to send an authentication vector get request message #2 to the unified data management function. The authentication vector get request message #2 carries the permanent identifier.

The transceiver module is further configured to receive an authentication vector get response message #2 from the unified data management function.

In a possible implementation, the transceiver module is further configured to send a first authentication request response to the access and mobility management function. The first authentication request response includes first indication information, and the first indication information indicates that the terminal device supports an authentication and key management for application service.

In a possible implementation, the processing module is further configured to generate the authentication and key management for application-key identifier #1 based on the routing indicator in the authentication vector get response message #1.

According to an eighth aspect, an embodiment of this application provides a communication apparatus, including:

a transceiver module, configured to receive an authentication request message #2 from an access and mobility management function, where the authentication request message #2 includes a permanent identifier, where the transceiver module is further configured to send an authentication vector get request message #2 to a unified data management function, where the authentication vector get request message #2 carries the permanent identifier; and the transceiver module is further configured to receive an authentication vector get response message #2 from the unified data management function, where the authentication vector get response message #2 includes indication information of authentication and key management for application; and a processing module, further configured to determine, based on the indication information of authentication and key management for application, that an authentication and key management for application-key identifier needs to be generated, where the transceiver module is further configured to: when the authentication management function does not have a routing indicator locally, obtain the routing indicator from a core network element; and the processing module is further configured to generate an authentication and key management for application-key identifier #2 by using the routing indicator.

In a possible implementation, the core network element includes the unified data management function or the access and mobility management function.

According to a ninth aspect, an embodiment of this application provides a communication apparatus. The communication apparatus includes a processor, a memory, and a transceiver connected to the processor. The memory stores a computer program or computer instructions, and the processor is further configured to invoke and run the computer program or the computer instructions stored in the memory, so that the processor implements any one of the first aspect to the fourth aspect or the implementations of the first aspect to the fourth aspect.

Optionally, the processor is configured to control the transceiver to perform any one of the first aspect to the fourth aspect or the implementations of the first aspect to the fourth aspect.

According to a tenth aspect, an embodiment of this application provides a computer program product including computer instructions. When the computer program product runs on a computer, the computer is enabled to perform any one of the first aspect to the fourth aspect or the implementations of the first aspect to the fourth aspect.

According to an eleventh aspect, an embodiment of this application provides a computer-readable storage medium, including computer instructions. When the computer instructions are run on a computer, the computer is enabled to perform any one of the first aspect to the fourth aspect or the implementations of the first aspect to the fourth aspect.

According to a twelfth aspect, an embodiment of this application provides a communication apparatus. The communication apparatus includes an entity such as a network device, a terminal device, or a chip. The communication apparatus includes a processor, configured to invoke a computer program or computer instructions in a memory, so that the processor performs any one of the first aspect to the fourth aspect or the implementations of the first aspect to the fourth aspect.

Optionally, the processor is coupled to the memory through an interface.

According to a thirteenth aspect, an embodiment of this application provides a communication system. The communication system includes the communication apparatus in the fifth aspect, the communication apparatus in the sixth aspect, the communication apparatus in the seventh aspect, and/or the communication apparatus in the eighth aspect.

According to a fourteenth aspect, an embodiment of this application further provides a processor, configured to perform the foregoing methods. In a process of performing these methods, a process of sending the foregoing information and a process of receiving the foregoing information in the foregoing methods may be understood as a process of outputting the foregoing information by the processor and a process of receiving the foregoing input information by the processor. When outputting the information, the processor outputs the information to a transceiver, so that the transceiver transmits the information. After the information is output by the processor, other processing may further need to be performed on the information before the information arrives at the transceiver. Similarly, when the processor receives the foregoing input information, the transceiver receives the foregoing information, and inputs the foregoing information into the processor. Further, after the transceiver receives the foregoing information, other processing may need to be performed on the foregoing information before the information is input into the processor.

Based on the foregoing principle, for example, receiving the authentication request message #1 from the AMF mentioned in the foregoing method may be understood as that the processor inputs the authentication request message #1. For another example, sending the authentication vector get request message #1 may be understood as that the processor outputs the authentication vector get request message #1.

Unless otherwise specified, if operations such as transmitting, sending, and receiving related to the processor do not contradict actual functions or internal logic of the operations in related descriptions, all the operations may be more generally understood as operations such as outputting, receiving, and inputting performed by the processor, instead of operations such as transmitting, sending, and receiving directly performed by a radio frequency circuit and an antenna.

In an implementation process, the processor may be a processor dedicated to performing these methods, or a processor, for example, a general-purpose processor, that executes computer instructions in the memory to perform these methods. The memory may be a non-transitory memory such as a read-only memory (ROM). The memory and the processor may be integrated on a same chip, or may be separately disposed on different chips. A type of the memory and a manner of disposing the memory and the processor are not limited in embodiments of this application.

According to a fifteenth aspect, an embodiment of this application provides a chip system. The chip system includes a processor and an interface. The interface is configured to obtain a program or instructions. The processor is configured to invoke the program or the instructions to implement or support a network device in implementing functions in the first aspect, the second aspect, the third aspect, and/or the fourth aspect, for example, determining or processing at least one of data and information in the foregoing methods.

In a possible design, the chip system further includes a memory. The memory is configured to store program instructions and data that are necessary for the network device. The chip system may include a chip, or may include a chip and another discrete component.

BRIEF DESCRIPTION OF THE DRAWINGS

FIG. 1o is a schematic diagram of an embodiment of a communication apparatus according to an embodiment of this application;

DETAILED DESCRIPTION OF ILLUSTRATIVE EMBODIMENTS

Figure 1A:
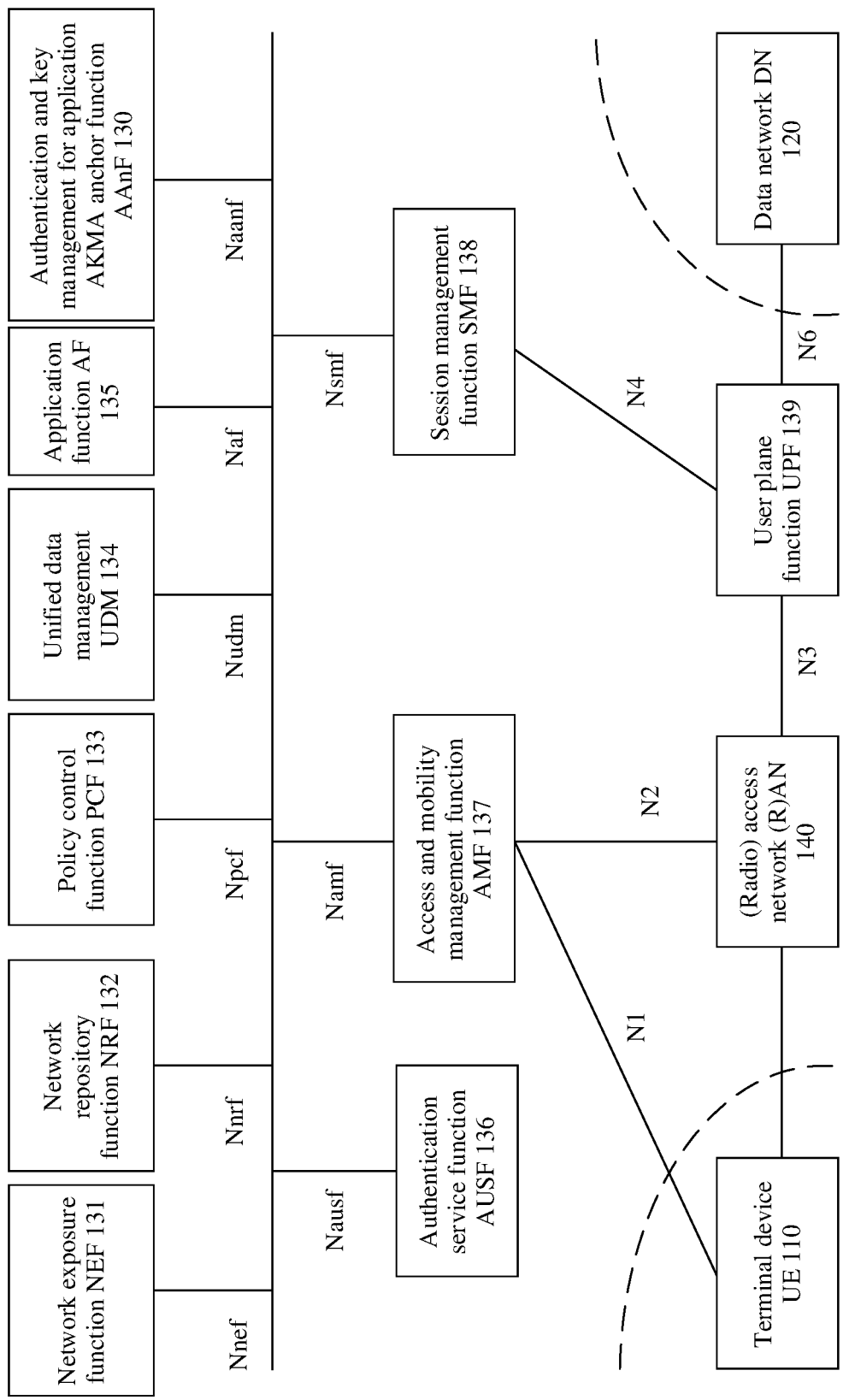
FIG. 1*a* is a schematic diagram of a network architecture of a communication system.

The following clearly describes the technical solutions in embodiments of this application with reference to the accompanying drawings in embodiments of this application. It is clear that the described embodiments are merely some but not all of embodiments of this application. All other embodiments obtained by a person skilled in the art based on embodiments of this application without creative efforts shall fall within the protection scope of this application.

In the specification, claims, and accompanying drawings of this application, the terms "first", "second", corresponding ordinal number terms, and the like are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "have", and any other variants thereof mean to cover the non-exclusive inclusion, so that a process, method, system, product, or device that includes a series of units is not necessarily limited to those units, but may include other units not expressly listed or inherent to such a process, method, product, or device.

In descriptions of this application, "/" means "or" unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists. In addition, in the descriptions of this application, "at least one item" means one or more items, and "a plurality of items" means two or more items. "At least one item (piece) of the following" or a similar expression thereof means any combination of these items, including a singular item (piece) or any combination of plural items (pieces). For example, at least one of a, b, or c may indicate a, b, c, a and b, a and c, b and c, or a, b, and c, where a, b, and c may be in a singular form or a plural form.

The technical solutions of embodiments of this application may be applied to various communication systems, such as a wideband code division multiple access (WCDMA) system, a general packet radio service (general packet radio service, GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communication system, a 5th generation (5G) system or an NR system, and a future sixth generation communication system.

Various communication systems operated by operators may be referred to as operator networks. The operator network, also referred to as a public land mobile network (PLMN), is a network established and operated by a government or an operator approved by the government to provide a land mobile communication service for the public. The operator network is mainly a public network in which a mobile network operator (MNO) provides a mobile broadband access service for users. The operator network or the PLMN network described in embodiments of this application may be a network that meets a requirement of 3rd generation partnership project (3GPP) standards, which is referred to as a 3GPP network for short. Usually, the 3GPP network is operated by operators, and includes but is not limited to a 5th-generation (5G) mobile communication network (5G network for short), a 4th-generation (4G) mobile communication network (4G network for short), or a 3rd-generation (3G) mobile communication technology network (3G network for short). The 3GPP network further includes a future 6G network. For ease of description, an operator network (for example, a mobile network operator (MNO) network) is used as an example for description in embodiments of this application.

To facilitate understanding of embodiments of this application, a 5G network architecture shown in FIG. 1a is used as an example to describe an application scenario used in this application. It may be understood that an architecture of another communication network is similar to that of the 5G network, and therefore details are not described. FIG. 1a is a schematic diagram of a network architecture of a communication system. The network architecture may include the following parts: terminal device (which may also be referred to as user equipment), operator network, and data network (DN)).

The terminal device part includes a terminal device 110, which may also be referred to as user equipment (UE). The terminal device no in embodiments of this application is a device having a wireless transceiver function, and may communicate with one or more core networks (CNs) via an access network device in a (radio) access network (access network, (R)AN) 14o. The terminal device no may also be referred to as an access terminal, a terminal, a subscriber unit, a subscriber station, a mobile station, a remote station, a remote terminal, a mobile device, a user terminal, a wireless network device, a user agent, a user apparatus, or the like. The terminal device no may be deployed on land, including an indoor or outdoor device, a handheld device, or a vehicle-mounted device, may be deployed on water (for example, on a ship), or may be deployed in the air (for example, on an airplane, a balloon, or a satellite). The terminal device no may be a cellular phone, a cordless phone, a session initiation protocol (SIP) phone, a smartphone, a mobile phone, a wireless local loop (WLL) station, a personal digital assistant (PDA), a handheld device having a wireless communication function, a computing device or another device connected to a wireless modem, a vehicle-mounted device, a wearable device, an uncrewed aerial vehicle device or an internet of things, a terminal in an internet of vehicles, a terminal in any form in a fifth generation (5G) mobile communication network and a future network, relay user equipment, a terminal in a future evolved public land mobile network (PLMN), or the like. The relay user equipment may be, for example, a 5G residential gateway (residential gateway, RG). For example, the terminal device no may be a virtual reality (virtual reality, VR) terminal, an augmented reality (AR) terminal, a wireless terminal in industrial control, a wireless terminal in self driving, a wireless terminal in remote medical (remote medical), a wireless terminal in a smart grid, a wireless terminal in transportation safety, a wireless terminal in a smart city, a wireless terminal in a smart home, or the like. This is not limited in embodiments of this application. For ease of description, an example in which the terminal device no includes an uncrewed aerial vehicle and an uncrewed aerial vehicle remote controller is used for description in embodiments of this application.

It should be noted that the uncrewed aerial vehicle in embodiments of this application may further include a vehicle that can travel autonomously, a vehicle that can travel based on a control instruction of a remote controller, a ship (shipping) that can sail autonomously, a ship that can sail based on a control instruction of a remote controller, or the like.

The operator network may include a unified data management (UDM) 134, an authentication management function (AUSF) 136, an access and mobility management function (AMF) 137, a session management function (SMF) 138, a user plane function (UPF) 139, a (R)AN 140, and the like. In the operator network, a part other than the (R)AN 140 part may be referred to as a core network (CN) part or a core network part. For ease of description, in embodiments of this application, an example in which the (R)AN 140 is a RAN is used for description.

The data network DN 120, also referred to as a protocol data network (protocol data network, PDN), is usually a network beyond the operator network, for example, a third-party network. The operator network may access a plurality of data networks DNs 120. A plurality of services may be deployed on the data network DN 120, and the data network DN 120 may provide services such as data and/or voice for the terminal device no. For example, the data network DN 120 may be a private network of a smart factory, a sensor installed in a workshop of the smart factory may be the terminal device no, a control server of the sensor is deployed in the data network DN 120, and the control server may provide a service for the sensor. The sensor may communicate with the control server, to obtain an instruction of the control server, transmit collected sensor data to the control server based on the instruction, and the like. For another example, the data network DN 120 may be an internal office network of a company, a mobile phone or a computer of an employee of the company may be the terminal device no, and the mobile phone or the computer of the employee may access information, data resources, and the like on the internal office network of the company.

The terminal device no may establish a connection to the operator network through an interface (for example, N1) provided by the operator network, and use the services such as data and/or voice provided by the operator network. The terminal device no may further access the data network DN 120 through the operator network, and use an operator service deployed in the data network DN 120 and/or a service provided by a third party. The third party may be a service provider other than the operator network and the terminal device no, and may provide another service such as data and/or voice for the terminal device no. A specific representation form of the third party may be specifically determined based on an actual application scenario, and is not limited herein.

The following briefly describes a network function in the operator network.

The (R)AN 140 may be considered as a sub-network of the operator network, and is an implementation system between a service node in the operator network and the terminal device 110. To access the operator network, the terminal device no first passes through the (R)AN 140, and then may be connected to the service node in the operator network via the (R)AN 140. An access network device (a RAN device) in embodiments of this application is a device that provides a wireless communication function for the terminal device 110, and may also be referred to as a network device. The RAN device includes but is not limited to a next generation node base station (next generation node base station, gNB) in a 5G system, an evolved NodeB (eNB) in long term evolution (LTE), a radio network controller (RNC), a NodeB (NB), a base station controller (BSC), and a base transceiver station (BTS), a home base station (for example, a home evolved NodeB, or a home NodeB, HNB), a base band unit (BBU), a transmitting and receiving point (TRP), a transmitting point (TP), a small cell device (pico), a mobile switching center, a network device in a future network, or the like. In systems using different radio access technologies, devices with functions of the access network device may have different names. For ease of description, in all the embodiments of this application, the foregoing apparatuses that provide the wireless communication function for the terminal device no are collectively referred to as the access network device, or referred to as a RAN or an AN for short. It should be understood that a specific type of the access network device is not limited in this specification.

The access and mobility management function AMF (which may also be referred to as an AMF network element, an AMF network function, or an AMF network function entity) 137 is a control plane network function provided by the operator network, and is responsible for access control and mobility management when the terminal device 110 accesses the operator network, for example, including functions such as mobility status management, temporary user identifier assignment, and user authentication and authorization.

The session management function SMF (which may also be referred to as an SMF network element, an SMF network function, or an SMF network function entity) 138 is a control plane network function provided by the operator network, and is responsible for managing a protocol data unit (PDU) session of the terminal device no. The PDU session is a channel for transmitting a PDU, and the terminal device needs to transmit the PDU to the data network DN 120 through the PDU session. The SMF network function 138 is responsible for establishment, maintenance, deletion, and the like of the PDU session. The SMF network function 138 includes functions related to a session, for example, session management (for example, session establishment, modification, and release, including tunnel maintenance between the user plane function UPF 139 and the (R)AN 140), selection and control of the UPF network function 139, service and session continuity (SSC) mode selection, and roaming.

The user plane function UPF (which may also be referred to as a UPF network element, a UPF network function, or a UPF network function entity) 139 is a gateway provided by an operator, and is a gateway for communication between the operator network and the data network DN 120. The UPF network function 139 includes functions related to a user plane, for example, data packet routing and transmission, data packet detection, service usage reporting, quality of service (QoS) processing, lawful interception, uplink data packet detection, and downlink data packet storage.

The unified data management network element UDM (which may also be referred to as a UDM network element, a UDM network function, or a UDM network function entity) 134 is a control plane function provided by the operator, and is responsible for storing information like a permanent identifier (SUPI) of a subscriber, a generic public subscription identifier (GPSI) of the subscriber, and a credential that are in the operator network. The SUPI is first encrypted during transmission, and an encrypted SUPI is referred to as a subscription concealed identifier (SUCI). The information stored in the UDM 134 may be used for authentication and authorization when the terminal device no accesses the operator network. The subscriber in the operator network may be specifically a user using a service provided by the operator network, for example, a user using a SIM card of "China Telecom", or a user using a SIM card of "China Mobile". The credential of the subscriber may be a long-term key stored in the SIM card or a stored small file, for example, information related to encryption of the SIM card, and used for authentication and/or authorization. It should be noted that the permanent identifier, the credential, security context, cookie, and a token are equivalent to information related to verification/authentication and authorization, and are not limited or distinguished between each other for ease of description in embodiments of this application.

The authentication management function (AUSF) (which may also be referred to as an AUSF network element, an AUSF network function, or an AUSF network function entity) 136 is a control plane function provided by the operator, and is usually used for primary authentication, to be specific, authentication between the terminal device no (the subscriber) and the operator network. After receiving an authentication request initiated by the subscriber, the AUSF 136 may perform authentication and/or authorization on the subscriber based on authentication information and/or authorization information stored in the UDM network function 134, or generate authentication information and/or authorization information of the subscriber using the UDM network function 134. The AUSF network function 136 may feed back the authentication information and/or the authorization information to the subscriber. In an authentication and key management for application (Authentication and key management for Application, AKMA) scenario, an AKMA anchor key Kakma (the authentication and key management for application key is also referred to as an AKMA root key) is generated for an authentication and key management for application anchor function (Authentication and key management for Application (AKMA) Anchor Function, AAnF) 130, and the AAnF 130 is responsible for generating, for an application function (AF) 135, a key Kaf used by the AF 135 and a validity period of the key Kaf.

A network exposure function (NEF) 131 functions as an intermediate network element to provide interaction services for the external application function (AF) 135 and the authentication and key management for application anchor function (Authentication and key management for Application (AKMA) Anchor Function, AAnF) 130 in the core network.

The network repository function (NRF) 132 is configured to perform registration, management, or state detection on a network function (Network Function, NF), to implement automated management of all NFs. When an NF is enabled, the NF needs to register with the NRF to provide a service. Registration information includes an NF type, an address, or a service list.

A policy control function (PCF) 133 interacts with the AF 135 to obtain a quality of service (QoS) parameter, or provides a QoS parameter to the AF 135, thereby implementing a function that may affect data transmission of an application.

The application function AF 135 interacts with a 3rd generation partnership project (3GPP) core network to provide an application layer service, for example, provide application layer data routing, and provide a network access capability. The AF 135 may interact with the NEF 131, and may interact with the PCF 133. In the authentication and key management for application (AKMA) scenario, the AF 135 needs to interact with the AAnF 130 to obtain an AF root key (Kaf) and a validity period of the Kaf. The AF 135 may be located inside a 5G core network, or may be located outside the 5G core network. If the AF is inside the 5G core network, the AF may directly interact with the PCF 133. If the AF 135 is outside the 5G core network, the NEF 131 serves as an intermediate node to forward content of interaction between the AF 135 and the PCF 133. For example, the content is forwarded through the NEF.

The authentication and key management for application AKMA anchor function AAnF 130 interacts with the AUSF 136 to obtain an AKMA root key (Kakma), and is responsible for generating, for the AF 135, the key Kaf used by the AF 135 and the validity period of the key Kaf.

In FIG. 1a, Nausf, Nudm, Namf, Nsmf, Nnrf, Nnef, Naanf, Naf, N1, N2, N3, N4, and N6 are interface sequence numbers. For meanings of these interface sequence numbers, refer to meanings defined in the 3GPP standard protocol. Details are not described herein. It should be noted that in FIG. 1a, only an example in which the terminal device 110 is UE is used for description. Names of interfaces between network functions in FIG. 1a are merely examples. In specific implementation, the names of the interfaces in the system architecture may be other names. This is not specifically limited in this embodiment of this application.

For ease of description, in embodiments of this application, an example in which a mobility management network function is the AMF network function 137 is used for description. Alternatively, the mobility management network function may be another network function having the AMF network function 137 in a future communication system. Alternatively, the mobility management network function in this application may be a mobility management network element (MME) or the like in LTE. Further, the AMF network function 137 is briefly referred to as an AMF, and the terminal device 110 is referred to as UE. In other words, in embodiments of this application, all AMFs described below may be replaced with the mobility management network function, and all UEs may be replaced with the terminal device.

A key identifier generation method provided in this application may be applied to various communication systems, for example, an internet of things (IoT) system, a narrow band internet of things (NB-IoT) system, a long term evolution (LTE) system, a fifth generation (5G) communication system, an LTE and 5G hybrid architecture, a 5G new radio (new radio, NR) system, and a new communication system emerging in future communication development. The 5G communication system in this application may include at least one of a non-standalone (non-standalone, NSA) 5G communication system and a standalone (SA) 5G communication system. Alternatively, the communication system may be a public land mobile communication network (pu-PLMN) network, a device-to-device (D2D) network, a machine to machine (M2M) network, or another network.

In addition, embodiments of this application are also applicable to another future-oriented communication technology, for example, 6G. Network architectures and service scenarios described in this application are intended to describe the technical solutions in this application more clearly, and do not constitute any limitation on the technical solutions provided in this application. A person of ordinary skill in the art may know that, with evolution of network architectures and emergence of new service scenarios, network functions in this application may change, and the technical solutions provided in this application are also applicable to similar technical problems.

Figure 2:
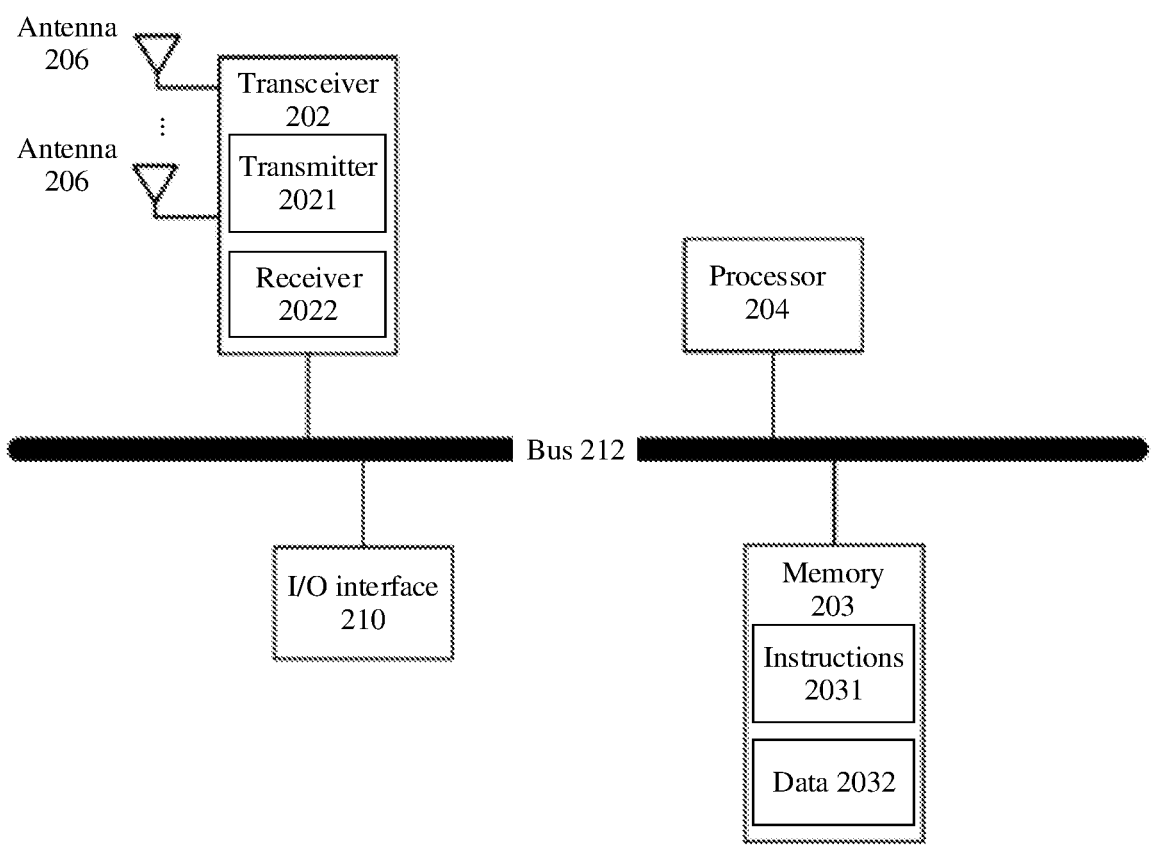
FIG. 2 is a schematic diagram of a hardware structure of a communication apparatus according to an embodiment of this application.

FIG. 2 is a schematic diagram of a hardware structure of a communication apparatus according to an embodiment of this application. The communication apparatus may be a possible implementation of a network device or a terminal device in embodiments of this application. As shown in FIG. 2, the communication apparatus includes at least a processor 204, a memory 203, and a transceiver 202. The memory 203 is further configured to store instructions 2031 and data 2032. Optionally, the communication apparatus may further include antennas 206, an I/O (input/output) interface 210, and a bus 212. The transceiver 202 further includes a transmitter 2021 and a receiver 2022. In addition, the processor 204, the transceiver 202, the memory 203, and the I/O interface 210 are communicatively connected to each other through the bus 212, and the antennas 206 are connected to the transceiver 202.

The processor 204 may be a general-purpose processor, for example, but not limited to, a central processing unit (CPU), or may be a dedicated processor, for example, but not limited to, a digital signal processor (DSP), an application-specific integrated circuit (ASIC), or a field programmable gate array (FPGA). Alternatively, the processor 204 may be a neural network processing unit (NPU). In addition, the processor 204 may alternatively be a combination of a plurality of processors. In particular, in the technical solutions provided in embodiments of this application, the processor 204 may be configured to perform related steps of a key identifier generation method in subsequent method embodiments. The processor 204 may be a processor that is specially designed to perform the foregoing steps and/or operations, or may be a processor that performs the foregoing steps and/or operations by reading and executing the instructions 2031 stored in the memory 203. The processor 204 may need to use the data 2032 in a process of performing the foregoing steps and/or operations.

The transceiver 202 includes the transmitter 2021 and the receiver 2022. In an optional implementation, the transmitter 2021 is configured to send a signal via the antenna 206. The receiver 2022 is configured to receive a signal via at least one of the antennas 206. In particular, in the technical solutions provided in embodiments of this application, the transmitter 2021 may be specifically configured to perform, via at least one of the antennas 206, for example, the operation performed by a receiving module or a sending module in a network device or a terminal device when the key identifier generation method in the subsequent method embodiments is applied to the network device or the terminal device.

In embodiments of this application, the transceiver 202 is configured to support the communication apparatus in performing the foregoing receiving function and sending function. A processor having a processing function is considered as the processor 204. The receiver 2022 may also be referred to as an input port, a receiver circuit, or the like. The transmitter 2021 may be referred to as a transmitter, a transmitter circuit, or the like.

The processor 204 may be configured to execute the instructions stored in the memory 203, to control the transceiver 202 to receive a message and/or send a message, to complete functions of the communication apparatus in the method embodiments of this application. In an implementation, it may be considered that a function of the transceiver 202 is implemented by a transceiver circuit or a dedicated transceiver chip. In embodiments of this application, that the transceiver 202 receives a message may be understood as that the transceiver 202 inputs a message, and that the transceiver 202 sends a message may be understood as that the transceiver 202 outputs a message.

The memory 203 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 203 is specifically configured to store the instructions 2031 and the data 2032. The processor 204 may perform the steps and/or the operations in the method embodiments of this application by reading and executing the instructions 2031 stored in the memory 203. The data 2032 may need to be used in a process of performing the operations and/or the steps in the method embodiments of this application.

Optionally, the communication apparatus may further include the I/O interface 210. The I/O interface 210 is configured to receive instructions and/or data from a peripheral device, and output instructions and/or data to the peripheral device.

The following describes some background technologies in embodiments of this application.

(1) AKMA

Figure 3:
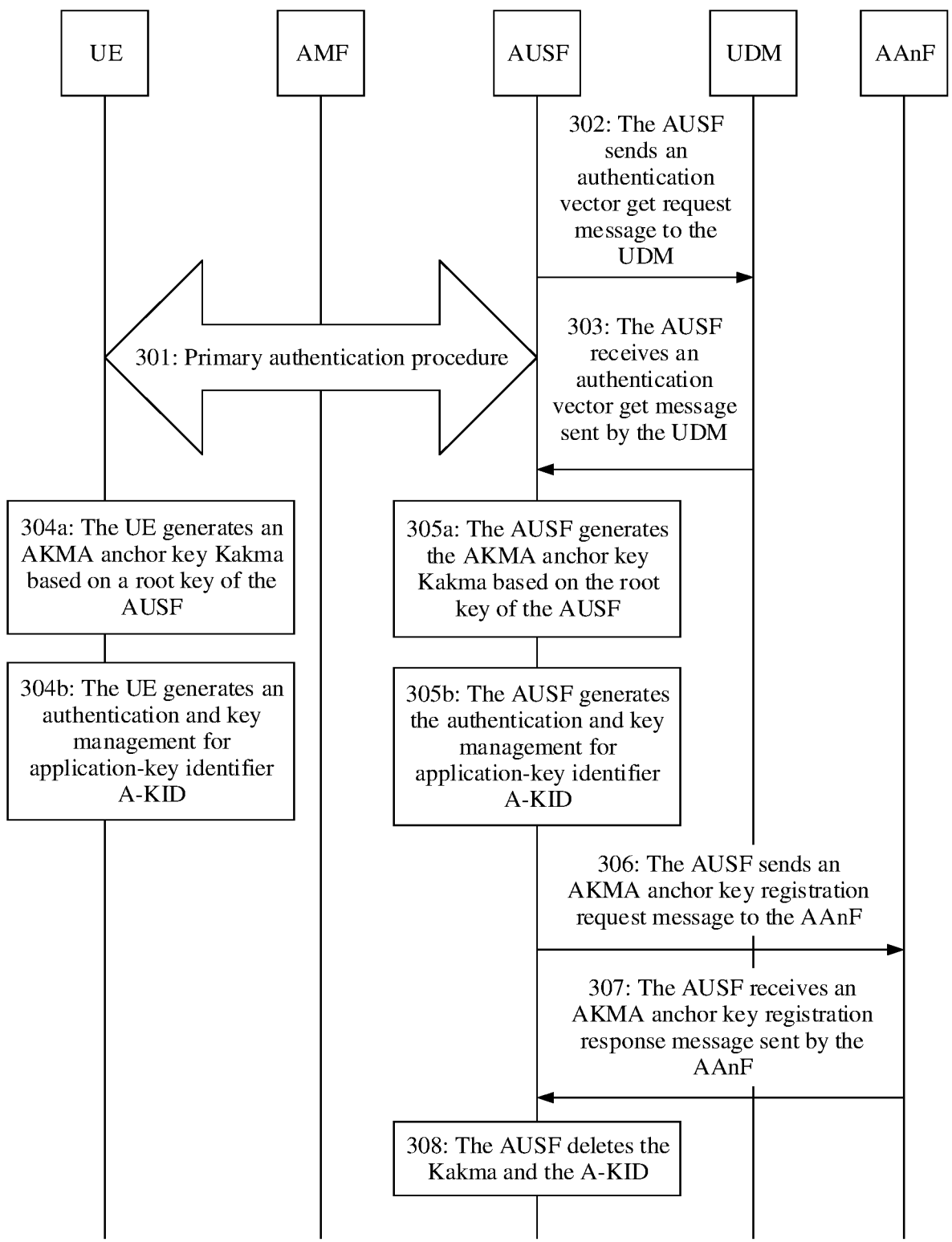
FIG. 3 is a schematic diagram of an access procedure of UE through forwarding.

For ease of understanding, refer to FIG. 3. FIG. 3 is a schematic diagram of an access procedure of UE through forwarding. FIG. 3 is used as an example to describe an AKMA procedure. Details are as follows.

301: A primary authentication procedure is performed between the UE and a core network.

In step 301, the primary authentication procedure is performed between the UE and the core network. An authentication vector (AV) is required in the primary authentication procedure. The authentication vector is used to transmit a verification parameter of the primary authentication procedure in the primary authentication procedure. Specifically, in step 302, an AUSF obtains the authentication vector.

In embodiments of this application, the primary authentication procedure is also referred to as an authentication procedure. This is not limited herein.

302: The AUSF sends an authentication vector get request message to a UDM.

In step 302, the AUSF sends the authentication vector get request message to the UDM, where the authentication vector get request message is, for example, "Numd_UEAuthentication Get Request". The authentication vector get request message requests the authentication vector from the UDM. The authentication vector get request message carries a SUPI or an SUCI. Specifically, when a message sent by an AMF to the AUSF carries the SUPI, the authentication vector get request message carries the SUPI. When the message sent by the AMF to the AUSF carries the SUCI, the authentication vector get request message carries the SUCI.

The SUCI may be understood as an encrypted form of the SUPI. For a specific SUCI generation method, refer to the 3GPP standard TS 33.501. In summary, an encrypted part in the SUCI may be obtained by performing encryption calculation on a part other than a mobile country code (MCC) in the SUPI using a universal subscriber identity module (USIM) card or a mobile equipment (ME). In addition to the encrypted part, the SUCI includes a RID, the MCC, and an MNC.

303: The AUSF receives an authentication vector get response message sent by the UDM.

In step 303, after the UDM receives the authentication vector get request message in step 302, the UDM determines a corresponding authentication vector. The UDM sends the authentication vector get response message to the AUSF, where the authentication vector get response message carries the authentication vector. For example, the authentication vector get response message is "Num_UEAuthentication_Get Response".

Optionally, the UDM determines, based on user subscription data corresponding to the SUPI, whether the UE corresponding to the primary authentication procedure supports an AKMA service. When the UE supports the AKMA service, the authentication vector get response message carries AKMA service indication information. The AKMA service indication information may be "AKMA Indication" or "AKMA ID". This is not limited in embodiments of this application. The AKMA service indication information indicates that the AUSF needs to generate an AKMA anchor key Kakma for the UE. It may also be understood as follows: The AKMA service indication information indicates that the UE supports the AKMA service. If the UE does not support the AKMA service, the authentication vector get request message does not carry the AKMA service indication.

It should be noted that the AKMA indication and the AKMA ID may use a same information element, or may use different information elements. This is not limited herein.

304a: The UE generates the AKMA anchor key Kakma based on a root key of the AUSF.

In step 304a, after the primary authentication procedure of the UE is successfully completed, the UE generates the AKMA anchor key (Kakma) based on a root key (Kausf) that is the same as that used by the AUSF. Optionally, further, before the UE needs to initiate the AKMA service, the UE generates the AKMA anchor key (Kakma) based on the root key (Kausf) that is the same as that used by the AUSF.

304b: The UE generates an authentication and key management for application-key identifier A-KID.

In step 304b, after the primary authentication procedure of the UE is successfully completed, before the UE needs to initiate the AKMA service, the UE generates the authentication and key management for application-key identifier (AKMA-Key Identifier, A-KID) based on the root key (Kausf) that is the same as that used by the AUSF. The A-KID identifies the AKMA anchor key Kakma of the UE. Optionally, further, before the UE needs to initiate the AKMA service, the UE generates the A-KID based on the root key (Kausf) that is the same as that used by the AUSF. Specifically, the UE generates an authentication and key management for application-temporary UE identifier (A-TID) part in the A-KID based on the root key (Kausf) that is the same as that used by the AUSF.

Specifically, the A-KID is generated based on the RID. A format of the A-KID is "username@example". The "username" part includes the routing indicator and an authentication and key management for application-temporary UE identifier (AKMA Temporary UE Identifier, A-TID). The "example" part includes a home network identifier, for example, a mobile country code (MCC) and a mobile network code (MNC). The A-TID is a temporary identifier generated based on Kausf.

It should be noted that an execution sequence of step 304a and step 304b is not limited.

305a: The AUSF generates the AKMA anchor key Kakma based on the root key of the AUSF.

Step 305a is similar to step 304a. Details are not described again. A difference from 304a lies in that, after the AUSF receives the authentication vector get response message, if the message carries the AKMA service indication information, the AUSF generates Kakma and the A-KID based on Kausf obtained by the AUSF. If the authentication vector get response message does not carry the AKMA service indication information, the AUSF may not generate Kakma and the A-KID.

305b: The AUSF generates the authentication and key management for application-key identifier A-KID.

In step 305b, when the authentication vector get response message sent by the UDM in step 303 carries AKMA identifier information, the AUSF determines, based on the AKMA identifier information, that the A-KID needs to be generated. When the AMF provides the SUCI to the AUSF in step 302, in step 305b, the AUSF generates the A-KID based on the RID in the SUCI.

306: The AUSF sends an AKMA anchor key registration request message to an AAnF.

In step 306, after the AUSF selects one AAnF, the AUSF sends the AKMA anchor key registration request message to the AAnF. For example, the AKMA anchor key registration request message is "Naanf_AKMA_AnchorKey_Register Request". Specifically, the AKMA anchor key registration request message carries the SUPI, the A-KID, and Kakma.

307: The AUSF receives an AKMA anchor key registration response message sent by the AAnF.

In step 307, the AAnF sends the AKMA anchor key registration response message to the AUSF based on the AKMA anchor key registration request message in step 306. For example, the AKMA anchor key registration response message is "Naanf_AKMA_AnchorKey_Register Response".

308: The AUSF deletes Kakma and the A-KID.

In step 308, after the AUSF receives the AKMA anchor key registration response message sent by the AAnF, the AUSF deletes Kakma and the A-KID.

(2) RID

The SUCI includes the RID. According to a current standard, the RID is used by the AMF to search for the AUSF, and the AUSF to search for the UDM. In the AKMA procedure, the RID is used to generate the A-KID. The RID is further used to select the AAnF.

In a 5G universal subscriber identity module (USIM) card, the RID is stored in the USIM. When a 5G UE uses the 5G USIM, the 5G UE obtains the RID to be used from the 5G USIM. A value of the RID may be a non-default value, or may be a default value.

However, there is no RID in a 4G USIM. Therefore, if the 5G UE uses the 4G USIM, the RID in the SUCI is padded with a default value.

In the AMF, UE context includes the RID. It may be understood that after the AMF obtains the RID from the SUCI, the RID is stored in the AMF. In the AKMA procedure shown in FIG. 3, when the AMF provides the SUPI to the AUSF in step 302, the SUPI does not include the RID. However, according to the current standard, the AUSF does not store the RID of the UE. As a result, when the AMF provides the SUPI to the AUSF in step 302, the AUSF cannot generate the A-KID (the RID is a necessary parameter for generating the A-KID) in step 305b. Consequently, the AKMA procedure fails.

For example, when the UE sends a 5G globally unique temporary UE identity (5G-GUTI) to the AMF in the registration request message, the AMF may determine, based on a local policy, whether to perform authentication on the UE. When the AMF determines to perform authentication on the UE, that is, initiate the primary authentication procedure, the SUPI is carried in the authentication request message that is sent by the AMF to the AUSF and that is used to trigger authentication on the UE (step 302). In this case, the AUSF cannot obtain the RID. Consequently, the AUSF cannot generate the A-KID. For example, the request message for authenticating the UE is an "Nausf_UEAuthentication_Authenticate Request" message.

Based on this, embodiments of this application provide a key identifier generation method, to ensure that an AUSF can obtain a RID, thereby ensuring that the AUSF generates an A-KID, and ensuring that an AKMA service of UE is successfully performed. A brief description is provided below before the specific embodiments are described. Based on different RID sources, embodiments of this application may be further divided into the following:

1. The AUSF stores the RID, where the RID is from an AMF or a UDM. For details, refer to the embodiment shown in FIG. 4.
2. The AUSF obtains the RID from a core network element, where he core network element includes the AMF or the UDM.
   2.1. Specifically, the AUSF obtains the RID from the AMF. Refer to the embodiment shown in FIG. 5 and/or the embodiment shown in FIG. 6.
   2.2. Specifically, the AUSF obtains the RID from the UDM. Refer to the embodiment shown in FIG. 7 and/or the embodiment shown in FIG. 8.

It should be noted that, in embodiments of this application, for ease of differentiation, the RID carried in an SUCI is referred to as a RID #1, the RID from the UDM is referred to as a RID #2, the RID from the AMF is referred to as a RID #3, and the RID stored in the AUSF is referred to as a RID #4. It can be understood that the RID #1, the RID #2, the RID #3, and the RID #4 may have a same value. Therefore, reference numerals may be used interchangeably in subsequent embodiments.

Figure 4:
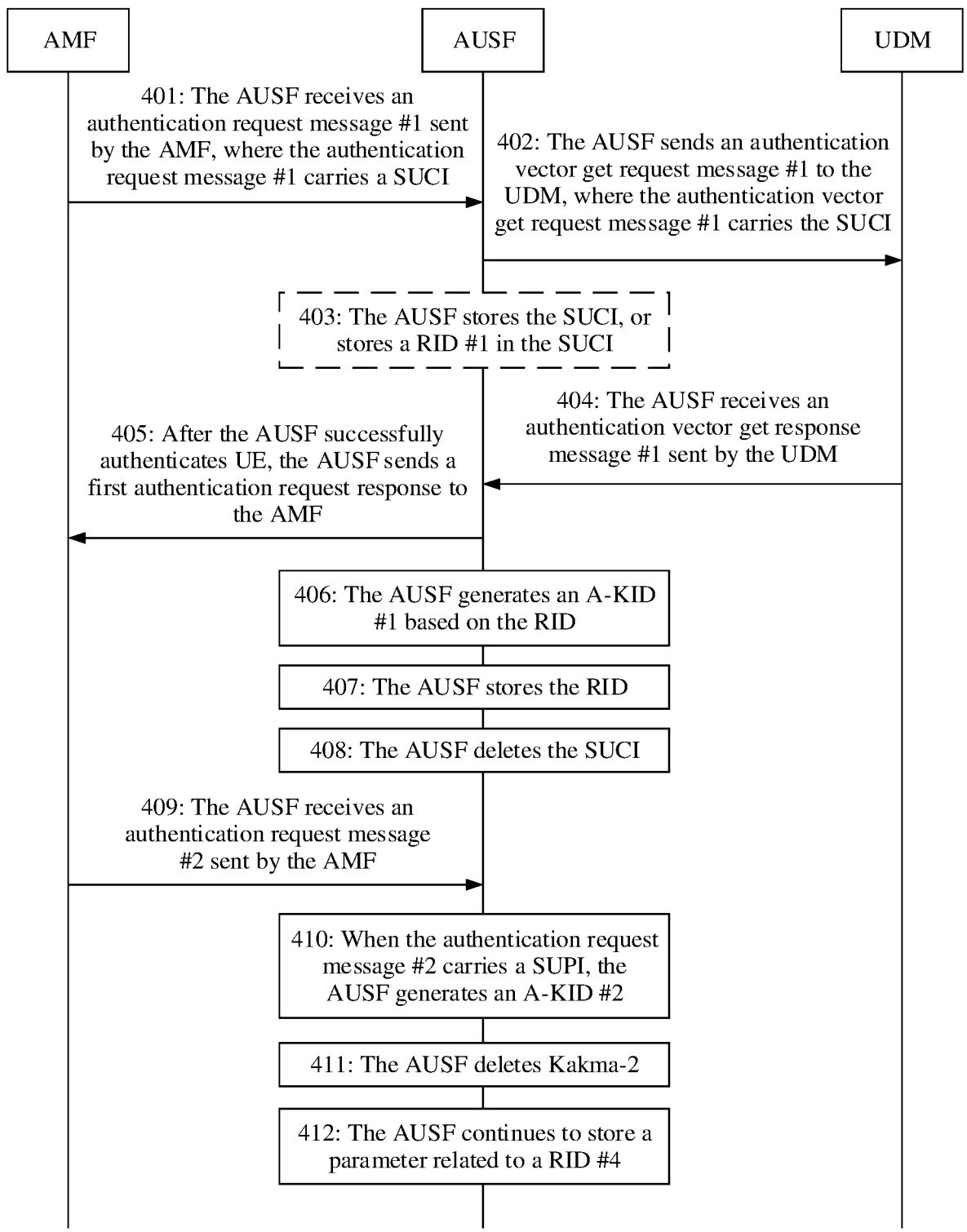
FIG. 4 is a schematic diagram of an embodiment of a key identifier generation method according to an embodiment of this application.

A solution in which an AUSF stores a RID is first described. FIG. 4 is a schematic diagram of an embodiment of a key identifier generation method according to an embodiment of this application. The key identifier generation method provided in this embodiment of this application includes the following steps.

401: The AUSF receives an authentication request message #1 sent by an AMF, where the authentication request message #1 carries a SUCI.

The AUSF receives the authentication request message #1 sent by the AMF, where the authentication request message #1 carries the SUCI. Specifically, the authentication request message #1 is "Nausf_UEAuthentication_Authenticate Request".

The RID carried in the SUCI is a RID #1.

402: The AUSF sends an authentication vector get request message #1 to the UDM, where the authentication vector get request message #1 carries the SUCI.

After the AUSF receives the authentication request message #1 sent by the AMF, the AUSF sends the authentication vector get request message #1 to the UDM. The authentication vector get request message #1 carries the SUCI.

For example, the authentication vector get request message #1 may be "Nudm_UE_Authentication_Get_Request".

403: The AUSF stores the SUCI, or stores the RID #1 in the SUCI.

After step 401, the AUSF may locally store the SUCI, or the AUSF may locally store the RID #1 in the SUCI. This is not limited herein.

Step 403 is an optional step.

Step 403 may be performed before step 402. To be specific, after the AUSF receives the authentication request message #1 carrying the SUCI, the AUSF first stores the SUCI, or stores the RID #1 in the SUCI, and then step 402 is performed.

In another understanding, this step is temporary storage, and the temporary storage is for the following purpose. After the AUSF receives an authentication vector get response message, if the AUSF determines that UE supports an AKMA service, the AUSF may generate an A-KID #1 by using the RID #1 in the SUCI. If the AUSF determines that the UE does not support the AKMA service (that is, the AUSF does not receive AKMA indication), the AUSF may delete the SUCI or delete a RID #4 in a subsequent procedure.

After obtaining the RID #1 in the SUCI, the AUSF locally stores the RID #1. In this case, the local RID is referred to as the RID #4.

404: The AUSF receives an authentication vector get response message #1 sent by the UDM.

Optionally, the authentication vector get response message #1 carries a RID #2.

After step 402, the UDM receives the authentication vector get request message #1 sent by the AUSF. After the AUSF receives the authentication vector get response message #1 from the UDM, the AUSF performs an authentication operation on the UE (UE corresponding to the authentication request message #1). An authentication operation manner is performing a primary authentication procedure. For the primary authentication procedure, refer to related descriptions in section 6 in the standard TS 33.501.

The authentication vector get response message #1 further carries an authentication vector (authentication vector, AV).

Optionally, the authentication vector get response message #1 further carries indication information of authentication and key management for application AKMA indication.

For example, the authentication vector get response message #1 is "Nudm_UE_Authentication_Get_Response". When authentication succeeds, the AUSF sends an authentication request response (authentication success) to the AMF.

Optionally, the authentication vector get response message #1 may further carry the RID #1. In this case, the authentication vector get response message #1 further carries the AKMA indication and the AV. Further, after determining that the UE supports the AKMA service, the UDM determines the RID #2, and includes the RID #2 in the authentication vector get response message #1. The UDM sends the RID #2 again to ensure that the AUSF has an available RID. For example, if the AUSF does not perform step 403, the AUSF can obtain the RID #2 only in step 404, and generate the A-KID #1 by using the RID #2.

405: After the AUSF successfully authenticates the UE, the AUSF sends a first authentication request response to the AMF.

For example, the first authentication request response is an "Nausf_UEAuthentication_Authenticate Response" message, and the message carries an extensible authentication protocol-success (EAP-success) message or carries indication information notifying the AMF whether authentication on the UE succeeds.

406: The AUSF generates the A-KID #1 based on the RID.

After the AUSF receives the authentication vector get response message #1 from the UDM, if the AUSF determines, based on the AKMA service indication information, that the UE supports the AKMA service, the AUSF generates the authentication and key management for application-key identifier A-KID #1.

In an optional implementation, when step 403 is performed, the AUSF generates the A-KID #1 based on the RID #1 in the locally stored SUCI, or the AUSF generates the A-KID #1 based on the locally stored RID #4. It may also be understood that the AUSF generates the A-KID #1 based on the RID #1 in the SUCI carried in the authentication request message #1 in step 401.

In another optional implementation, when step 403 is not performed, and an optional method for sending the RID #2 in step 404 is performed, the AUSF generates the A-KID #1 based on the RID #2 sent by the UDM.

If the AUSF does not receive the AKMA indication in step 404, and if step 403 is performed, the AUSF deletes the locally stored SUCI or the RID #1 in the SUCI.

After the AUSF generates the A-KID #1, the AUSF may send the A-KID #1, a SUPI, and Kakma to an AAnF. Specifically, the message may be sent to the AAnF via "Naanf_AnchorKey_Register Request". After receiving the message, the AAnF replies to the AUSF with "Naanf_AKMA_Register Response".

Further, the AUSF generates Kakma based on the SUCI. For differentiation, Kakma generated herein is referred to as Kakma-1.

407: The AUSF stores the RID.

Further, after determining that the UE supports the AKMA service (that is, after receiving the AKMA indication), the AUSF determines to store the RID #1. Specifically, after the AUSF receives the AKMA indication of the UE, it indicates that the AUSF needs to generate Kakma and an A-KID. In this case, the AUSF determines that the UE supports the AKMA service.

The RID stored in the AUSF in step 407 may be the RID #1 or the RID #2 based on different RID sources.

It should be noted that if step 403 is performed, after determining that the UE supports the AKMA service, the AUSF continues to store the SUCI, or stores the RID #1 in the SUCI.

It should be noted that if step 403 is not performed, and the optional method for sending the RID #2 in step 404 is performed, after the AUSF determines that the UE supports the AKMA service, the AUSF stores the RID #2.

In step 407, there are a plurality of optional implementations in which the AUSF stores a parameter related to the RID #1. The following separately provides descriptions. It should be noted that the parameter related to the RID #1 includes but is not limited to the RID #1, the SUCI, and/or the A-KID #1.

Solution 1: The AUSF stores the RID #1 in the SUCI and an association relationship between the RID #1 and the SUPI. For example, the RID #1 and the SUPI are stored. The association relationship between the RID #1 and the SUPI is stored, so that when the AUSF receives the SUPI, the AUSF determines the RID #1 based on the SUPI.

Solution 2: The AUSF stores the SUCI, that is, the AUSF does not separately store the RID #1. Further, the AUSF stores the SUCI and an association relationship between the SUCI and the SUPI.

Solution 3: The AUSF stores the RID #1, the SUCI, and an association relationship between the RID #1, the SUCI, and the SUPI.

It should be noted that an execution sequence of step 407 and step 406 is not limited herein. Specifically, the AUSF may first generate the A-KID #1, and then store the RID #1 or the SUCI. Alternatively, the AUSF may store the RID #1 or the SUCI, and then generate the A-KID #1. This is not limited herein.

Optionally, if the AUSF deletes the RID #1 and/or the SUCI after generating the A-KID #1, the AUSF stores the A-KID #1. In this case, in step 410, the AUSF generates an A-KID #2 based on the A-KID #1. Specifically, the AUSF generates the A-KID #2 based on the RID #1 in the A-KID #1. Further, the AUSF stores an association relationship between the A-KID #1 and the SUPI. Optionally, when a value of the RID #1 is a default value, the AUSF may not store the RID #1 in step 407. In this case, in step 410, the AUSF generates the A-KID #2 by using the default value of the RID #1.

It should be noted that if step 403 is performed, storing does not need to be repeatedly performed in step 407. It may be understood that step 407 is a continuation of step 403. To be specific, if step 403 is performed, the AUSF only needs to further determine that the UE supports the AKMA service, and then only needs to further store the association relationship between the RID #1 and the SUPI when performing step 407.

It should be noted that, if step 403 is not performed, and the optional method for sending the RID #2 in step 404 is performed, storing does not need to be repeatedly performed in step 407. It may be understood that step 407 is a continuation of step 404. To be specific, if the optional method for sending the RID #1 in step 404 is performed, and after the AUSF determines that the UE supports the AKMA service, the AUSF only needs to be further store the association relationship between the RID #1 and the SUPI in step 407.

408: The AUSF deletes the SUCI.

Step 408 is an optional step. Specifically, after the AUSF stores the SUCI in step 403, when the AUSF further stores the RID #4 and/or the A-KID #1, the AUSF may delete the SUCI.

When the AUSF stores a plurality of parameters related to the RID #1 (for example, the RID #1, the SUCI, and the A-KID #1), the AUSF may store only one of the parameters, and other redundant parameters may be considered to be deleted. For example, the SUCI mentioned in step 408 and the A-KID #1 mentioned in the foregoing step may be understood as parameters that are redundant relative to the RID #1. In this way, when the AUSF cannot obtain the RID #1 subsequently, the AUSF generates a new A-KID again.

409: The AUSF receives an authentication request message #2 sent by the AMF.

The AUSF receives the authentication request message #2 sent by the AMF, where the authentication request message #2 is used to trigger an authentication operation performed on the UE.

The authentication request message #2 may be "Nausf_UEAuthentication_Authenticate Request". When the authentication request message #2 carries the SUPI, step 410 is performed.

Optionally, when the authentication request message #2 carries the SUCI, a subsequent method is similar to steps 402 to 408. Details are not described herein again.

In another optional implementation, when the authentication request message #2 carries the SUCI, step 410 is subsequently performed.

After the AUSF receives the authentication request message #2, the AUSF may send an authentication vector get request message #2 "Nudm_UE_Authentication_Get_Request" to the UDM. The authentication vector get request message #2 carries the SUPI in the authentication request message #2. If the UDM determines, based on the SUPI, that the UE supports the AKMA service, the UDM replies an authentication vector get response message #2 "Nudm_UE_Authentication_Get_Response" that carries the AKMA service indication information (for example, the AKMA indication).

After step 409, after the AUSF successfully authenticates the UE, the AUSF sends a second authentication request response to the AMF. For example, the second authentication request response is "Nausf_UEAuthentication_Authenticate Response".

410: When the authentication request message #2 carries the SUPI, the AUSF generates the A-KID #2.

The AUSF determines Kausf based on the SUPI, and generates Kakma based on Kausf. For differentiation, Kausf herein is referred to as Kausf-2, and Kakma generated herein is referred to as Kakma-2.

The AUSF determines a parameter related to the RID based on the SUPI carried in the authentication request message #2. Then, the AUSF determines the RID based on the parameter related to the RID, and the AUSF generates the A-KID #2 based on the RID. The following separately describes various implementations.

In an implementation, when the authentication request message #2 carries the SUPI, the AUSF generates the A-KID #2 based on the RID #4. Specifically, the RID #4 is from the AUSF locally. Specifically, the AUSF determines, based on the SUPI, the RID #4 associated with the SUPI, and then generates the A-KID #2 based on the RID #4.

In another implementation, when the authentication request message #2 carries the SUPI, the AUSF generates the A-KID #2 based on the RID #4 in the SUCI. Specifically, the SUCI is from the AUSF locally. Specifically, the AUSF determines, based on the SUPI, the SUCI associated with the SUPI, and then generates the A-KID #2 based on the RID #1 in the SUCI.

In another implementation, when the authentication request message #2 carries the SUPI, the AUSF generates the A-KID #2 based on the RID #4 in the A-KID #1. Specifically, the A-KID #1 is from the AUSF locally. Specifically, the AUSF determines, based on the SUPI, the A-KID #1 associated with the SUPI, and then generates the A-KID #2 based on the RID #4 in the A-KID #1.

In another implementation, when the authentication request message #2 carries the SUPI, if the authentication vector get response message #2 carries the RID #2, the AUSF generates the A-KID #2 based on the received RID #2.

In another implementation, when the authentication request message #2 carries the SUPI, the AUSF does not locally store any parameter related to the RID #4 (for example, the SUCI, the A-KID, and/or the RID #4), and the AUSF does not receive a parameter related to the RID #2 from the UDM, the AUSF generates the A-KID #2 based on the default value of the RID. Optionally, after the AUSF generates the A-KID #2, the AUSF may send the A-KID #2, the SUPI, and Kakma-2 to the AAnF. Specifically, the message may be sent to the AAnF via "Naanf_AnchorKey_Register Request". After receiving the message, the AAnF replies to the AUSF with "Naanf_AKMA_Register Response".

411: The AUSF deletes Kakma-2.

412: The AUSF continues to store the parameter related to the RID #4.

In an implementation, the AUSF continues to store the RID #4, or the AUSF continues to store the SUCI or the A-KID #1. In addition, other redundant parameters are deleted. For example, after deleting the A-KID #2, the AUSF may continue to store the RID #4.

In another implementation, if the AUSF receives an SUCI #2 (the SUPI #2 is inconsistent with the SUCI received in step 401), the AUSF stores the RID #3, where a RID in the SUPI #2 is referred to as a RID #5. Alternatively, the AUSF stores the SUCI #2. It may be understood that the AUSF stores a parameter related to the RID #5 (for example, the SUCI #2 and/or the RID #5), and does not need to continue to store the parameter related to the RID #4. A specific operation may be directly overwriting, deleting and then storing, or storing and then deleting. This is not specifically limited in this application.

In another implementation, if the AUSF previously stores the A-KID #1, after generating the A-KID #2, the AUSF stores the A-KID #2. It may be understood that the AUSF stores the A-KID #2, and does not need to continue to store the A-KID #1. A specific operation may be directly overwriting, deleting and then storing, or storing and then deleting. This is not specifically limited in this application.

In embodiments of this application, in an AKMA procedure, the AUSF stores the parameter related to the RID (for example, the SUCI, the A-KID, and/or the RID), to ensure that the AUSF can generate, when the authentication vector get request message received by the AUSF carries the SUPI, a new A-KID by using the parameter related to the RID, thereby ensuring that the AKMA procedure is successfully performed.

Figure 5:
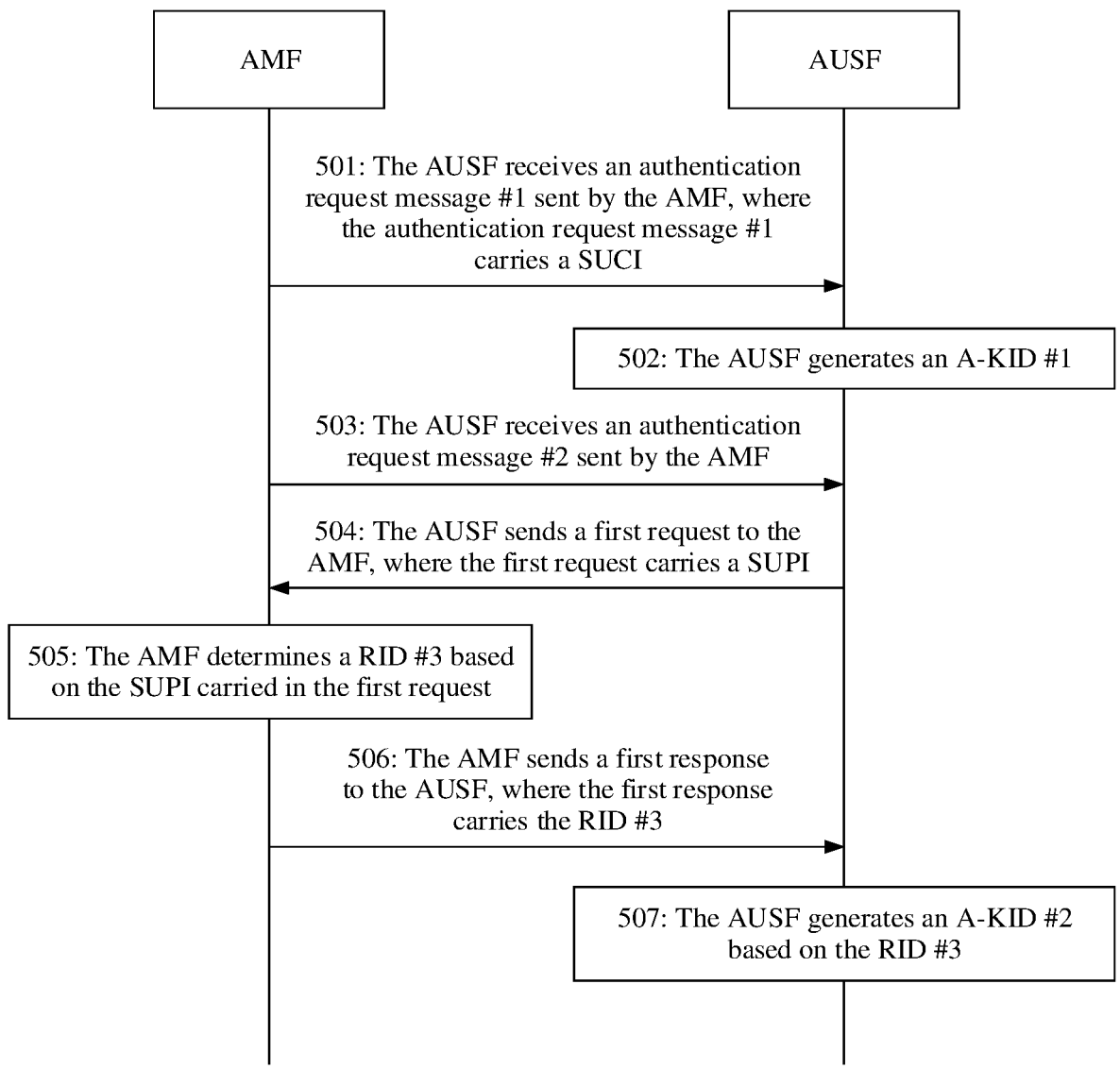
FIG. 5 is a schematic diagram of an embodiment of another key identifier generation method according to an embodiment of this application.

Based on the foregoing embodiment, refer to FIG. 5. FIG. 5 is a schematic diagram of an embodiment of another key identifier generation method according to an embodiment of this application. The key identifier generation method provided in this embodiment of this application includes:

501: An AUSF receives an authentication request message #1 sent by an AMF, where the authentication request message #1 carries a SUCI.

Step 501 is similar to step 401. Details are not described herein again.

502: The AUSF generates an A-KID #1.

In a possible implementation, after the AUSF receives the authentication request message #1, the AUSF generates the A-KID #1 based on a RID #1 in an SUCI in the authentication request message #1. Before the AUSF generates the A-KID #1, and after the AUSF receives the authentication request message #1, the AUSF may send an authentication vector get request message #1 to a UDM, where the authentication vector get request message #1 carries the SUCI. The authentication vector get request message may be "Nudm_UE_Authentication_Get_Request". After the UDM receives the authentication vector get request message #1 sent by the AUSF, the UDM sends an authentication vector get response message #1 to the AUSF, where the authentication vector get response message #1 carries an authentication vector (authentication vector, AV).

Optionally, when the UDM determines that UE corresponding to the SUCI supports an AKMA service, the authentication vector get response message #1 further carries indication information of authentication and key management for application AKMA indication. Optionally, the authentication vector get response message #1 carries the RID #1.

In another possible implementation, after the AUSF receives the authentication vector get response message #1, the AUSF generates the A-KID #1 based on the RID #1 in the authentication vector get response message #1.

For example, a RID #2 is carried only when the UDM determines that the UE corresponding to the SUCI supports the AKMA service. For example, the authentication vector get response message #1 is "Nudm_UE_Authentication_Get_Response". After the AUSF receives the authentication vector get response message #1 from the UDM, the AUSF performs an authentication operation on the UE (UE corresponding to the authentication request message #1). When authentication succeeds, the AUSF sends a first authentication request response to the AMF.

Optionally, the first authentication request response includes first indication information (indication), and the first indication information indicates that the UE supports the AKMA service. It should be noted that the first indication information and AKMA service indication information may use a same information element, or may use different information elements. This is not limited herein.

Further, after the AUSF receives the AKMA indication, the AUSF generates Kakma. For differentiation, Kakma generated herein is referred to as Kakma-1.

After the AUSF generates the A-KID #1, the AUSF may send the A-KID #1, a SUPI, and Kakma to an AAnF. Specifically, the message may be sent to the AAnF via "Naanf_AnchorKey_Register Request". After receiving the message, the AAnF replies to the AUSF with "Naanf_AKMA_Register Response". After receiving "Naanf_AKMA_Register Response", the AUSF generates Kakma-1 and the A-KID #1.

After receiving the message in step 501, the AUSF may temporarily store the SUCI or the RID #1 in the SUCI, and delete the SUCI or the RID #1 in the SUCI after determining that there is the AKMA service indication information and generating Kakma-1 and the A-KID #1.

503: The AUSF receives an authentication request message #2 sent by the AMF.

The AUSF receives the authentication request message #2 sent by the AMF. If the authentication request message #2 carries the SUPI, step 504 is performed.

Optionally, after the AUSF receives the authentication request message #2, the AUSF may send an authentication vector get request message #2 to the UDM, where the authentication vector get request message #2 carries the SUPI. The authentication vector get request message #2 may be "Nudm_UE_Authentication_Get_Request". After the UDM receives the authentication vector get request message #2 sent by the AUSF, the UDM sends an authentication vector get response message #2 to the AUSF, where the authentication vector get response message #2 carries the authentication vector (authentication vector, AV). Optionally, when the UDM determines that the UE corresponding to the SUPI supports the AKMA service, the authentication vector get response message #2 further carries the AKMA indication. For example, the authentication vector get response message #2 is "Nudm_UE_Authentication_Get_Response". After the AUSF receives the authentication vector get response message #2 from the UDM, the AUSF determines that the UE supports the AKMA service. The AUSF determines that an A-KID of the UE needs to be generated. The AUSF performs an authentication operation on the UE (UE corresponding to the authentication request message #2). When authentication succeeds, the AUSF sends an authentication request response (authentication success) to the AMF.

Optionally, the authentication request message #2 may carry a RID #3. This step is optional because in the conventional technology, the RID is optionally transferred from the AMF to the AUSF via an authentication request message. However, in the conventional technology, a function of transferring the RID is to help the AUSF quickly find, based on the RID, a UDM that can serve the UE.

In a possible implementation, if the authentication request message #2 carries the SUPI, the authentication request message #2 further carries the RID #3. This is to ensure that the AUSF has an available RID, to avoid a case in which when the AUSF determines that the UE corresponding to the SUPI supports the AKMA service, no RID is available for generating the A-KID.

504: The AUSF sends a first request to the AMF, where the first request carries the SUPI.

After the AUSF receives the authentication request message #2 sent by the AMF, the AUSF detects whether the authentication request message #2 carries the RID. Optionally, the AUSF further detects whether the AUSF locally stores a parameter related to a RID #4 (for example, the RID #4, the SUCI, and/or the A-KID #1).

If the authentication request message #2 does not have a parameter related to the RID, the AUSF sends the first request to the AMF, where the first request requests the RID. The first request carries the SUPI, and the SUPI is the SUPI carried in the authentication request message #2. Further, if neither the authentication request message #2 nor the AUSF locally has the parameter related to the RID, the AUSF sends the first request to the AMF, where the first request requests the RID.

Optionally, the first request carries indication information indicating that the RID is required.

Specifically, after the AUSF receives the authentication vector get response message #2 sent by the UDM, and the AUSF determines that the UE supports the AKMA service, if the AUSF does not receive the RID #4 in the authentication request message #2, and/or the AUSF does not locally store the RID #4, the AUSF sends the first request to the AMF.

In step 504, after the AUSF receives the authentication request message #2 sent by the AMF, there are two optional implementation solutions, which are separately described below.

Solution 1: Each time after receiving the authentication request message #2, the AUSF detects whether the authentication request message #2 carries the RID. Optionally, the AUSF further detects whether the AUSF locally stores the parameter related to the RID #4 (for example, the RID #4, the SUCI, and/or the A-KID #1). When a detection result is that the authentication request message #2 does not have the RID #3 (or the authentication request message #2 does not have the RID, and the AUSF does not locally have the parameter related to the RID #4), the AUSF sends the first request to the AMF. In step 506, the AUSF does not store the RID #3 carried in the first response from the AMF. In other words, each time after receiving the authentication request message #2, the AUSF detects whether the authentication request message #2 carries the RID. If the authentication request message #2 does not carry the RID, the AUSF sends the first request to the AMF.

Solution 2: After receiving the authentication request message #2, the AUSF detects whether the authentication request message #2 carries the RID. Optionally, the AUSF further detects whether the AUSF locally stores the parameter related to the RID #4 (for example, the RID #4, the SUCI, and/or the A-KID #1). When a detection result is that the authentication request message #2 does not have the RID #3 (or the authentication request message #2 does not have the RID, and the AUSF does not locally have the parameter related to the RID #4), the AUSF sends the first request to the AMF. In step 506, the AUSF stores the RID #3 carried in the first response from the AMF. In other words, after the AUSF receives, for the first time, the authentication request message #2 that does not carry the RID, the AUSF sends the first request to the AMF. In step 506, the AUSF stores the RID #3 returned by the AMF based on the first request. In a subsequent step, when the AUSF receives again the authentication request message #2 that does not carry the RID, the AUSF may perform a subsequent action based on the locally stored RID #4 (which is stored in step 506). For example, the first request is "Nudm_UE_AKMA_Get_Request".

After the AUSF receives the authentication request message #2 sent by the AMF, the AUSF determines whether the authentication request message #2 carries the RID. If the authentication request message #2 carries the RID, step 507 is performed.

After the AUSF receives the authentication request message #2 sent by the AMF, if the AUSF determines that the parameter related to the RID is locally stored, step 507 is performed.

505: The AMF determines the RID #3 based on the SUPI carried in the first request.

After receiving the first request, the AMF determines, based on the SUPI carried in the first request, the RID #3 corresponding to the SUPI.

In another implementation, after receiving the first request, the AMF first determines, based on the SUPI carried in the first request, the RID #3 corresponding to the SUPI. Then, the AMF constructs the SUCI based on the RID #3. For ease of differentiation, the SUCI constructed based on the RID #3 is referred to as an SUCI #3. Specifically, the AMF generates the SUCI #3 in a same manner as the UE based on a public key of a home network (HPLMN) and the SUPI of the UE. In this case, the AMF is required to locally store or obtain necessary parameters for generating the SUCI, such as the public key of the HPLMN and a public key identifier.

506: The AMF sends the first response to the AUSF, where the first response carries the RID #3.

The AMF sends the first response to the AUSF, where the first response carries the RID #3.

In another implementation, the first response sent by the AMF to the AUSF carries the SUCI #3 constructed in step 505. In this case, the first response does not carry the RID.

For example, the first response is "Nudm_UE_AKMA_Get_Response".

507: The AUSF generates an A-KID #2 based on the RID #3.

Further, the AUSF generates Kakma. For differentiation, Kakma generated herein is referred to as Kakma-2.

Optionally, after the AUSF generates the A-KID #2, the AUSF may send the A-KID #2, the SUPI, and Kakma-2 to the AAnF. Specifically, the message may be sent to the AAnF via "Naanf_AnchorKey_Register Request". After receiving the message, the AAnF replies to the AUSF with "Naanf_AKMA_Register Response".

After step 507, optionally, the AUSF may delete the A-KID #2.

After step 507, optionally, if the AUSF stores the A-KID #2 to facilitate obtaining of the RID #2, the AUSF may not delete the A-KID #2.

After step 507, the AUSF may delete Kakma-2.

After step 507, optionally, after deleting the A-KID #2, the AUSF may store the SUPI and/or the RID #3.

In this embodiment of this application, in an AKMA procedure, the AUSF may obtain the RID from the AMF, to ensure that the AUSF can generate, when the authentication vector get request message received by the AUSF carries the SUPI, a new A-KID by using the RID, thereby ensuring that the AKMA procedure is successfully performed.

Figure 6:
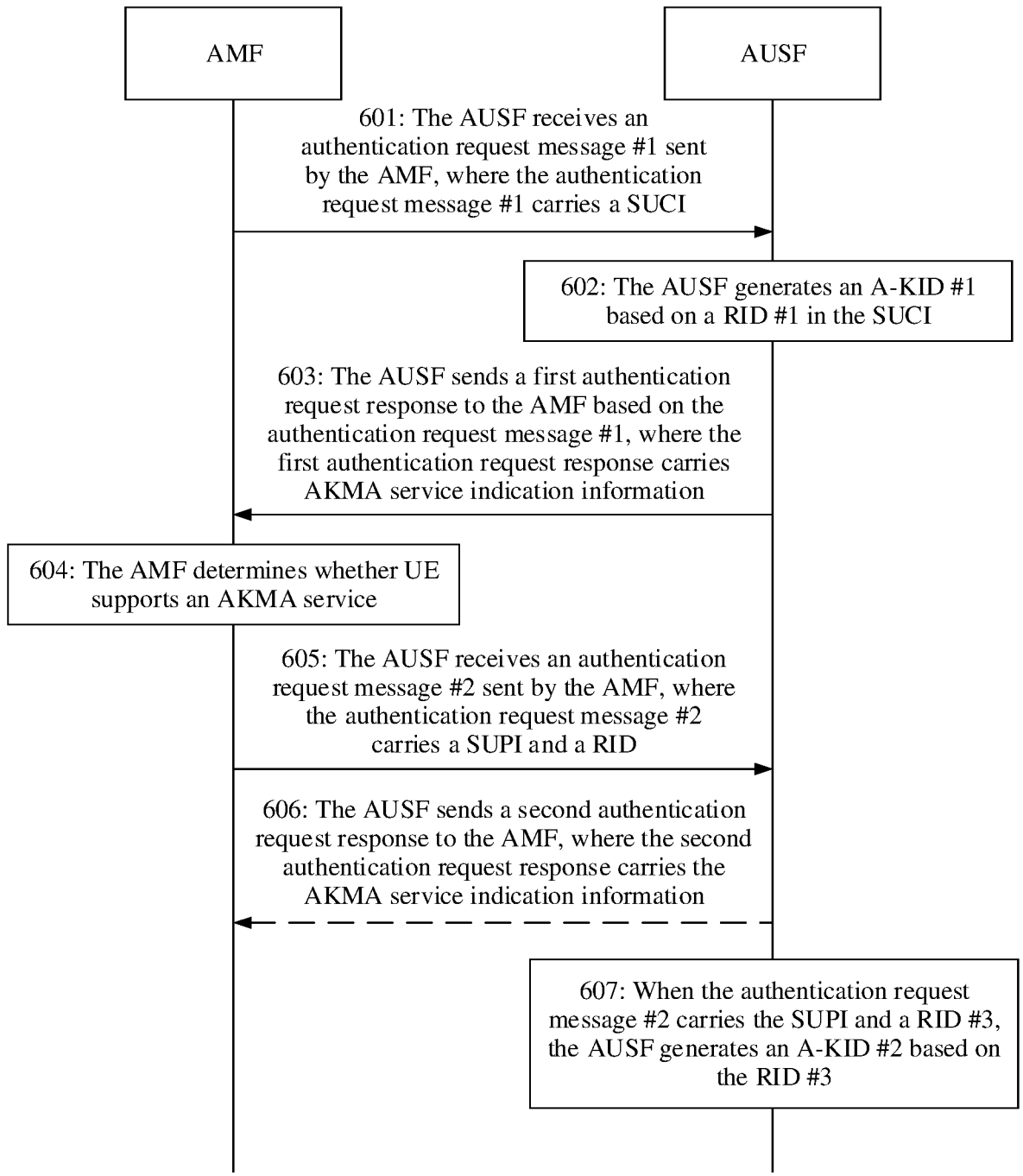
FIG. 6 is a schematic diagram of an embodiment of still another key identifier generation method according to an embodiment of this application.

Based on the foregoing embodiment, refer to FIG. 6. FIG. 6 is a schematic diagram of an embodiment of still another key identifier generation method according to an embodiment of this application. The key identifier generation method provided in this embodiment of this application includes:

601: An AUSF receives an authentication request message #1 sent by an AMF, where the authentication request message #1 carries a SUCI.

602: The AUSF generates an A-KID #1 based on a RID #1 in the SUCI.

Steps 601 and 602 are similar to the foregoing steps 501 and 502. Details are not described herein again.

603: The AUSF sends a first authentication request response to the AMF based on the authentication request message #1, where the first authentication request response carries AKMA service indication information.

The AUSF performs an authentication operation on UE based on the authentication request message #1. When authentication succeeds, the AUSF sends the first authentication request response to the AMF, where the first authentication request response carries indication information indicating that the UE supports an AKMA service, and the indication information may be generated by the AUSF. Alternatively, the indication information may be used to directly forward indication information received from the UDM to the AMF, for example, send an AKMA ID (or an AKMA indication) to the AMF. The indication information may be indication information whose value is 0 or 1. For example, when the value is 1, it indicates that the AKMA service is supported, and when the value is 0, it indicates that the AKMA service is not supported. For another example, when the value is 1, it indicates that the AKMA service is supported, and when the value is not present, it indicates that the AKMA service is not supported. The value may also be in a character string format of "AKMA", or be of an enumerated type of <AKMA enable> or <AKMA disable>. Whether the AKMA service is supported may be indicated by whether the value is present, or may be indicated by a specific meaning of the value.

For example, the first authentication request response is an "Nausf_UEAuthentication_Authenticate Response" message, and the message carries an EAP-success message or carries indication information notifying the AMF whether authentication on the UE succeeds.

604: The AMF determines whether the UE supports the AKMA service.

After the AMF obtains the first authentication request response, the AMF stores the AKMA service indication information. For example, an association relationship between the AKMA service indication information and a SUPI of the UE is stored.

605: The AUSF receives an authentication request message #2 sent by the AMF, where the authentication request message #2 carries the SUPI and a RID.

Before sending the authentication request message #2 to the AUSF, the AMF detects whether the UE supports the AKMA service. If the AMF determines that the UE supports the AKMA service, the authentication request message #2 carries a RID #2. The RID #2 is determined by the AMF based on the SUPI of the UE. The AMF determines, based on whether the AKMA service indication information is stored locally, whether the UE supports the AKMA service. Specifically, if the AMF locally stores the AKMA service indication information, the AMF determines that the UE supports the AKMA service. If the AMF does not locally store the AKMA service indication information, the AMF determines that the UE does not support the AKMA service.

If the AMF determines that the UE supports the AKMA service, step 606 continues to be performed.

In another implementation, the AMF determines the RID corresponding to the SUPI. Then, the AMF constructs the SUCI based on the RID. The authentication request message #2 carries a constructed SUCI #3. Optionally, in this case, the authentication request message #2 does not carry the SUCI and the RID. Specifically, the AMF generates the SUCI #3 in a same manner as the UE based on an HPLMN and the SUPI of the UE. In this case, the AMF is required to locally store or obtain necessary parameters for generating the SUCI, such as the public key of the HPLMN and a public key identifier.

For example, the authentication request message #2 is "Nausf_UEAuthentication_Authenticate request".

606: The AUSF sends a second authentication request response to the AMF, where the second authentication request response carries the AKMA service indication information.

After the AUSF completes the authentication operation on the UE based on the authentication request message #2, the AUSF sends the second authentication request response to the AMF, where the second authentication request response carries the AKMA service indication information. This method is also referred to as explicit carrying. Explicit carrying means that the AKMA service indication information needs to be sent to the AMF each time, and the AMF detects whether the AKMA service indication information of the UE still exists. If the AKMA service indication information of the UE still exists, the AMF may not update existing UE context information, or re-store the AKMA service indication information. If the AKMA service indication information does not exist, the AMF may consider that the UE no longer supports the AKMA service, and may delete the AKMA service indication information in the UE context.

Optionally, the second authentication request response may not carry the AKMA service indication information. In this case, the AMF may consider that the UE always supports the AKMA service. When the UE no longer supports the AKMA service, the AUSF sends AKMA service cancellation indication information, where the indication information indicates that the UE no longer supports the AKMA service. The AKMA service cancellation indication information and the AKMA service indication information may share one piece of bit information. For example, when the value is 0, it indicates that the UE does not support the AKMA service, and when the value is 1, it indicates that the UE supports the AKMA service. After the AMF receives the AKMA service cancellation indication information, the AMF updates the UE context information and deletes the AKMA service indication information. This method can reduce complexity of transferring a message by the AUSF to the AMF, and also reduce complexity of processing by the AMF.

607: When the authentication request message #2 carries the SUPI and a RID #3, the AUSF generates an A-KID #2 based on the RID #3.

After step 607, further, the AUSF generates Kakma. For differentiation, Kakma generated herein is referred to as Kakma-2.

Optionally, after the AUSF generates the A-KID #2, the AUSF may send the A-KID #2, the SUPI, and Kakma-2 to an AAnF. Specifically, the message may be sent to the AAnF via "Naanf_AnchorKey_Register Request". After receiving the message, the AAnF replies to the AUSF with "Naanf_AKMA_Register Response".

After step 607, optionally, the AUSF may delete Kakma-2.

In embodiments of this application, in an AKMA procedure, if the AMF determines that the UE supports the AKMA service, the AMF may include the RID in an authentication request message, and the AUSF obtains the RID from the authentication request message, to ensure that the AUSF can generate, when the authentication vector get request message received by the AUSF carries the SUPI, a new A-KID based on the RID, thereby ensuring that the AKMA procedure is successfully performed.

Figure 7:
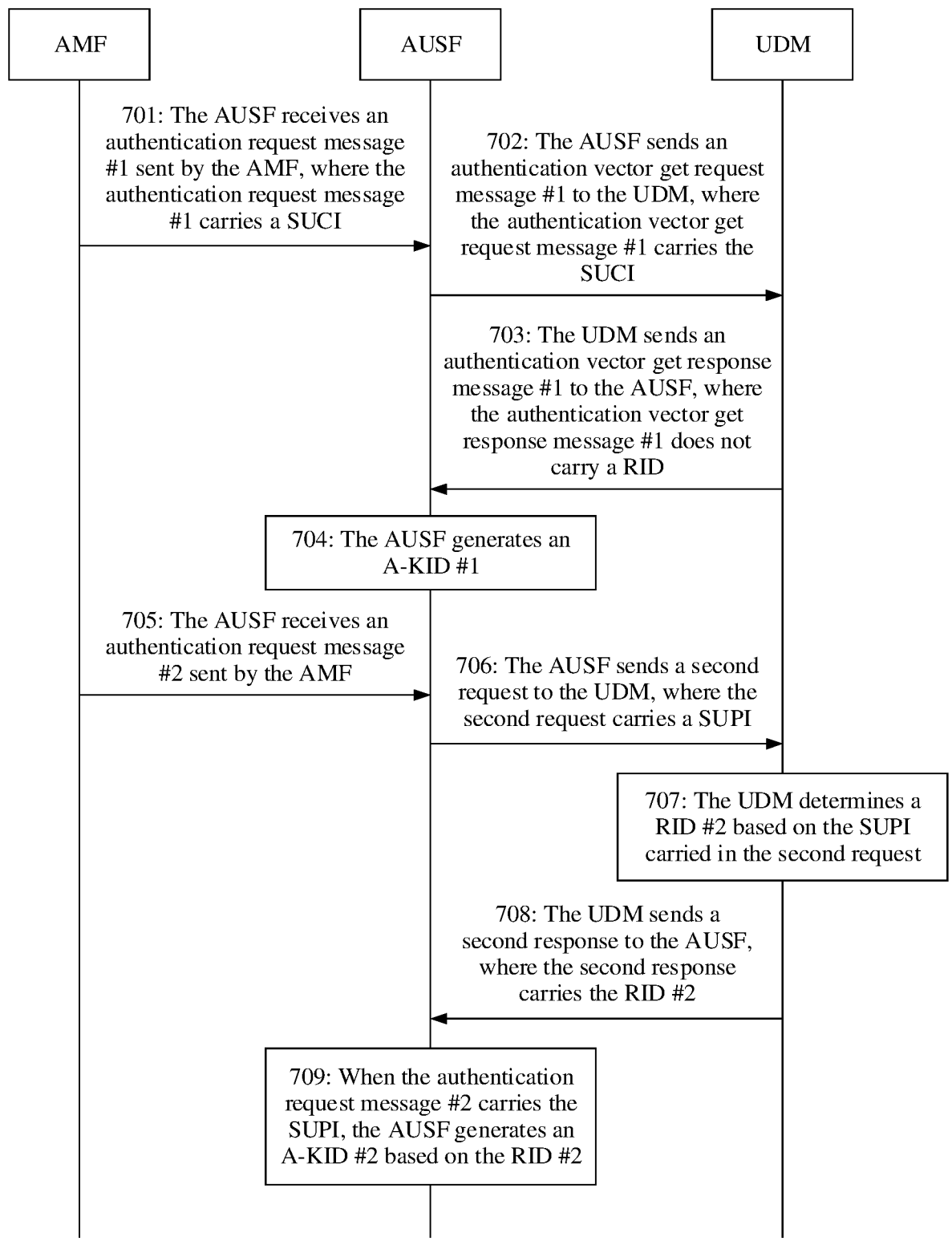
FIG. 7 is a schematic diagram of an embodiment of yet another key identifier generation method according to an embodiment of this application.

Based on the foregoing embodiment, a UDM may further provide a RID. Specifically, FIG. 7 is a schematic diagram of an embodiment of yet another key identifier generation method according to an embodiment of this application. The key identifier generation method provided in this embodiment of this application includes:

701: An AUSF receives an authentication request message #1 sent by an AMF, where the authentication request message #1 carries a SUCI.

Step 701 is similar to step 501. Details are not described herein again.

702: The AUSF sends an authentication vector get request message #1 to the UDM, where the authentication vector get request message #1 carries the SUCI.

After the AUSF receives the authentication request message #1 sent by the AMF, the AUSF sends the authentication vector get request message #1 to the UDM. The authentication vector get request message #1 carries the SUCI. The authentication vector get request message #1 is used to obtain a RID #2.

For example, the authentication vector get request message #1 is "Nudm_UE_Authentication_Get_Request".

703: The UDM sends an authentication vector get response message #1 to the AUSF, where the authentication vector get response message #1 does not carry the RID.

After the UDM receives the authentication vector get request message #1, the UDM sends the authentication vector get response message #1 to the AUSF. The authentication vector get response message #1 does not carry the RID.

For example, the authentication vector get response message #1 is "Nudm_UE_Authentication_Get_Response". After the AUSF receives the authentication vector get response message #1 from the UDM, the AUSF performs an authentication operation on the UE (UE corresponding to the authentication request message #1). When authentication succeeds, the AUSF sends an authentication request response (authentication success) to the AMF.

Optionally, the authentication vector get response message #1 further carries an authentication vector (AV).

Optionally, the authentication vector get response message #1 further carries indication information of authentication and key management for application AKMA indication.

For example, the authentication vector get response message #1 is "Nudm_UE_Authentication_Get_Response". When authentication succeeds, the AUSF sends an authentication request response (authentication success) to the AMF.

704: The AUSF generates an A-KID #1.

Step 704 is similar to step 502. Details are not described herein again.

705: The AUSF receives an authentication request message #2 sent by the AMF.

The AUSF receives the authentication request message #2 sent by the AMF. If the authentication request message #2 carries the SUPI, step 706 is performed.

Optionally, after the AUSF receives the authentication request message #2, the AUSF may send an authentication vector get request message #2 to the UDM, where the authentication vector get request message #2 carries the SUPI. The authentication vector get request message #2 may be "Nudm_UE_Authentication_Get_Request".

After the UDM receives the authentication vector get request message #2 sent by the AUSF, the AUSF determines, based on indication information of authentication and key management for application carried in an authentication vector get response message #2, that the UE supports the AKMA service. The AUSF determines that an A-KID of the UE needs to be generated. The UDM sends an authentication vector get response message #2 to the AUSF, where the authentication vector get response message #2 carries the authentication vector (authentication vector, AV). The authentication vector get response message #2 does not carry the RID.

Optionally, the authentication vector get response message #2 further carries the indication information of authentication and key management for application AKMA indication.

For example, the authentication vector get response message #2 is "Nudm_UE_Authentication_Get_Response".

After the AUSF receives the authentication vector get response message #2 from the UDM, the AUSF performs an authentication operation on the UE (UE corresponding to the authentication request message #2). When authentication succeeds, the AUSF sends an authentication request response (authentication success) to the AMF.

Further, the AUSF generates Kakma based on the SUPI.

706: The AUSF sends a second request to the UDM, where the second request carries the SUPI.

Optionally, the second request carries indication information indicating that the RID is required.

After the AUSF receives the authentication request message #2, the AUSF sends the second request to the UDM, where the second request requests the RID #2 from the UDM.

Optionally, after the AUSF generates Kakma, the AUSF sends the second request to the UDM.

Optionally, after the AUSF sends the authentication request response to the AMF, that is, after the AUSF completes authentication on the UE, the AUSF sends the second request to the UDM.

For example, the second request is "Nudm_UE_AKMA_Get_Request".

After the AUSF receives the authentication request message #2 sent by the AMF, the AUSF detects whether the authentication request message #2 carries the RID #2. Optionally, the AUSF further detects whether the AUSF locally stores a parameter related to a RID #4 (for example, the RID #4, the SUCI, and/or the A-KID #1).

If the authentication request message #2 does not have a parameter related to a RID #3, the AUSF sends the second request to the UDM, where the second request requests the RID. The second request carries the SUPI, and the SUPI is the SUPI carried in the authentication request message #2. Optionally, further, if neither the authentication request message #2 nor the AUSF locally has a parameter related to the RID (the RID #3 and the RID #4), the AUSF sends the second request to the UDM, where the second request requests the RID.

Optionally, the second request carries indication information indicating that the RID is required.

Specifically, after the AUSF receives the authentication vector get response message #2 sent by the UDM, and the AUSF determines that the UE supports the AKMA service, if the AUSF does not receive the RID #3 in the authentication request message #2, and/or the AUSF does not locally store the RID #4, the AUSF sends the second request to the UDM.

In step 706, after the AUSF receives the authentication request message #2 sent by the AMF, there are two optional implementation solutions, which are separately described below.

Solution 1: Each time after receiving the authentication request message #2, the AUSF detects whether the authentication request message #2 carries the RID. Optionally, the AUSF further detects whether the AUSF locally stores the parameter related to the RID #4 (for example, the RID #4, the SUCI, and/or the A-KID #1). When a detection result is that the authentication request message #2 does not have the RID #3 (the authentication request message #2 does not have the RID, and the AUSF does not locally have the parameter related to the RID #4), the AUSF sends the second request to the UDM. In step 708, the AUSF does not store the RID #1 carried in a second response from the UDM. In other words, each time after receiving the authentication request message #2, the AUSF detects whether the authentication request message #2 carries the RID #3. If the authentication request message #2 does not carry the RID #3, the AUSF sends the second request to the UDM.

Solution 2: After receiving the authentication request message #2, the AUSF detects whether the authentication request message #2 carries the RID. Optionally, the AUSF further detects whether the AUSF locally stores the parameter related to the RID #4 (for example, the RID #4, the SUCI, and/or the A-KID #1). When a detection result is that the authentication request message #2 does not have the RID #3 (or the authentication request message #2 does not have the RID #1, and the AUSF does not locally have the parameter related to the RID #4), the AUSF sends the second request to the UDM. In step 708, the AUSF stores the RID #2 carried in the second response from the UDM. In other words, after the AUSF receives, for the first time, the authentication request message #2 that does not carry the RID, the AUSF sends the second request to the UDM. In step 708, the AUSF stores the RID #3 returned by the AMF based on the second request. In a subsequent step, when the AUSF receives again the authentication request message #2 that does not carry the RID, the AUSF may perform a subsequent action based on the locally stored RID #4 (which is stored in step 708). For example, the second request is "Nudm_UE_AKMA_Get_Request".

After the AUSF receives the authentication request message #2 sent by the AMF, the AUSF determines whether the authentication request message #2 carries the RID #3. If the authentication request message #2 carries the RID #3, step 709 is performed.

After the AUSF receives the authentication request message #2 sent by the AMF, if the AUSF determines that the parameter related to the RID #4 is locally stored, step 709 is performed.

707: The UDM determines the RID #2 based on the SUPI carried in the second request.

After receiving a first request, the UDM determines, based on the SUPI carried in the second request, the RID #2 corresponding to the SUPI.

708: The UDM sends the second response to the AUSF, where the second response carries the RID #2.

The UDM sends the second response to the AUSF, where the second response carries the RID #2.

For example, the second response is "Nudm_UE_AKMA_Get_Response".

709: When the authentication request message #2 carries the SUPI, the AUSF generates an A-KID #2 based on the RID #2.

Further, the AUSF generates Kakma. For differentiation, Kakma generated herein is referred to as Kakma-2.

Optionally, after the AUSF generates the A-KID #2, the AUSF may send the A-KID #2, the SUPI, and Kakma-2 to an AAnF. Specifically, the message may be sent to the AAnF via "Naanf_AnchorKey_Register Request". After receiving the message, the AAnF replies to the AUSF with "Naanf_AKMA_Register Response".

After step 709, the AUSF may delete the A-KID #2.

After step 709, optionally, the AUSF may delete Kakma-2.

In this embodiment of this application, in an AKMA procedure, the AUSF may obtain the RID from the UDM, to ensure that the AUSF can generate, when the authentication vector get request message received by the AUSF carries the SUPI, a new A-KID by using the RID, thereby ensuring that the AKMA procedure is successfully performed.

Figure 8:
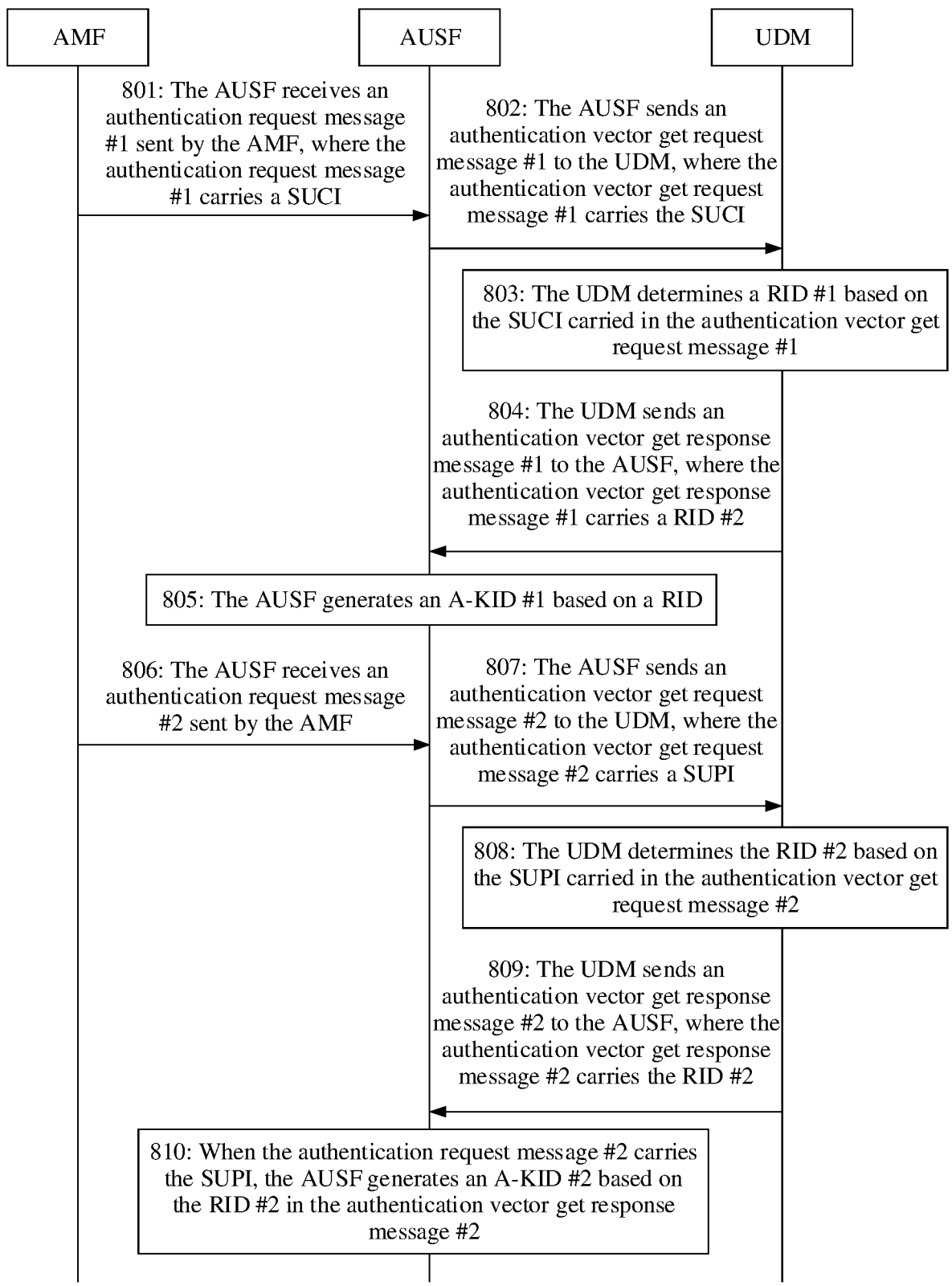
FIG. 8 is a schematic diagram of an embodiment of still yet another key identifier generation method according to an embodiment of this application.

Based on the foregoing embodiment, refer to FIG. 8. FIG. 8 is a schematic diagram of an embodiment of still another key identifier generation method according to an embodiment of this application. The key identifier generation method provided in this embodiment of this application includes:

801: An AUSF receives an authentication request message #1 sent by an AMF, where the authentication request message #1 carries a SUCI.

802: The AUSF sends an authentication vector get request message #1 to a UDM, where the authentication vector get request message #1 carries the SUCI.

Steps 801 and 802 are similar to the foregoing steps 701 and 702. Details are not described herein again.

803: The UDM determines a RID #1 based on the SUCI carried in the authentication vector get request message #1.

After the UDM determines the RID #1 based on the SUCI carried in the authentication vector get request message #1, the UDM stores the RID #1, and the RID #1 stored in the UDM is referred to as a RID #2.

Further, the UDM stores the RID #2 and an association relationship between the RID #2 and the SUPI.

Optionally, the UDM stores the RID #2, the SUCI, and an association relationship between the RID #1 and the SUCI. Further, the UDM stores the RID #2 and an association relationship between the SUCI and the SUPI.

Optionally, the UDM stores the SUCI, that is, the UDM does not separately store the RID #2. Further, the UDM stores the SUCI and an association relationship between the SUCI and the SUPI.

Optionally, when a value of a RID is a default value, the UDM may not store the RID #1 in step 803. In this case, the AUSF generates the A-KID #1 based on the default value in step 805.

804: The UDM sends an authentication vector get response message #1 to the AUSF, where the authentication vector get response message #1 carries the RID #2.

Further, after determining that UE supports an AKMA service, the UDM includes the RID #2 in the authentication vector get response message #1. The UDM sends the authentication vector get response message #1 to the AUSF, where the authentication vector get response message #1 carries the RID #2.

Optionally, the authentication vector get response message #1 does not carry the RID.

After the AUSF receives the authentication request message #1, the AUSF may send the authentication vector get request message #1 to the UDM, where the authentication vector get request message #1 carries the SUCI. The authentication vector get request message #1 may be "Nudm_UE_Authentication_Get_Request".

After the UDM receives the authentication vector get request message #1 sent by the AUSF, the UDM sends the authentication vector get response message #1 to the AUSF, where the authentication vector get response message #1 carries the RID #2. The authentication vector get response message #1 further carries an authentication vector (authentication vector, AV). Optionally, the authentication vector get response message #1 further carries indication information of authentication and key management for application AKMA indication. Optionally, the AUSF records that the UE supports the AKMA service. For example, the AUSF stores the AKMA indication. Further, the AUSF stores an association relationship between the AKMA indication and the SUPI. For example, the authentication vector get response message #1 is "Nudm_UE_Authentication_Get_Response".

After the AUSF receives the authentication vector get response message #1 from the UDM, the AUSF performs an authentication operation on the UE (UE corresponding to the authentication request message #1). When authentication succeeds, the AUSF sends an authentication request response (authentication success) to the AMF.

805: The AUSF generates the A-KID #1 based on the RID.

After the AUSF receives the authentication request message #1, the AUSF generates the A-KID #1 based on the RID #1 in the SUCI in the authentication request message #1.

Optionally, the AUSF generates the A-KID #1 based on the RID #2 carried in the authentication vector get response message #1.

Further, the AUSF generates Kakma. For differentiation, Kakma generated herein is referred to as Kakma-2.

Optionally, after the AUSF generates the A-KID #1, the AUSF may send the A-KID #1, the SUPI, and Kakma to an AAnF. Specifically, the message may be sent to the AAnF via "Naanf_AnchorKey_Register Request". After receiving the message, the AAnF replies to the AUSF with "Nanaf_AKMA_Register Response".

806: The AUSF receives an authentication request message #2 sent by the AMF.

For example, the authentication request message #2 is "Nausf_UEAuthentication_Authenticate Request".

807: The AUSF sends an authentication vector get request message #2 to the UDM, where the authentication vector get request message #2 carries the SUPI.

After the AUSF receives the authentication request message #2, the AUSF sends the authentication vector get request message #2 to the UDM, where the authentication vector get request message #2 carries the SUPI. The authentication vector get request message may be "Nudm_UE_Authentication_Get_Request".

The authentication vector get request message #2 carries indication information, and the indication information requests the UDM to deliver the RID #2. Specifically, the AUSF checks whether there is a storage record indicating that the UE supports the AKMA service, and if the AUSF determines that the UE supports the AKMA service, the AUSF includes the indication information in the authentication vector get request message #2.

Specifically, after the AUSF receives the authentication request message #2 sent by the AMF, the AUSF detects whether the authentication request message #2 carries a RID #3. Optionally, the AUSF further detects whether the AUSF locally stores a parameter related to a RID #4 (for example, the RID #4, the SUCI, and/or the A-KID #1).

If the authentication request message #2 does not have a parameter related to the RID, and the AUSF stores the AKMA service supported by the UE, the AUSF sends the authentication vector get request message #2 to the UDM, where the authentication vector get request message #2 requests the authentication vector and the RID. Specifically, the authentication vector get request message #2 carries the SUPI and the indication information. The indication information requests the UDM to deliver the RID #2.

808: The UDM determines the RID #2 based on the SUPI carried in the authentication vector get request message #2.

After the UDM receives the authentication vector get request message #2 sent by the AUSF, the UDM determines the RID #2 based on the SUPI carried in the authentication vector get request message #2.

The UDM determines, based on the indication information carried in the authentication vector get request message #2, the RID #2 corresponding to the SUPI.

809: The UDM sends an authentication vector get response message #2 to the AUSF, where the authentication vector get response message #2 carries the RID #2.

The UDM sends the authentication vector get response message #2 to the AUSF, where the authentication vector get response message #2 carries the RID #2.

The authentication vector get response message #2 further carries the authentication vector (AV).

Optionally, the authentication vector get response message #2 further carries the indication information of authentication and key management for application AKMA indication. For example, the authentication vector get response message #2 is "Nudm_UE_Authentication_Get_Response".

After the AUSF receives the authentication vector get response message #2 from the UDM, the AUSF performs an authentication operation on the UE (UE corresponding to the authentication request message #1). When authentication succeeds, the AUSF sends an authentication request response (authentication success) to the AMF.

810: When the authentication request message #2 carries the SUPI, the AUSF generates an A-KID #2 based on the RID #2 in the authentication vector get response message #2.

When the authentication request message #2 carries the SUPI, the AUSF generates the A-KID #2 based on the RID #2 in the authentication vector get response message #2. The RID #2 is from the authentication vector get response message #2 sent by the UDM.

Optionally, after the AUSF generates the A-KID #2, the AUSF may send the A-KID #2, the SUPI, and Kakma-2 to the AAnF. Specifically, the message may be sent to the AAnF via "Naanf_AnchorKey_Register Request". After receiving the message, the AAnF replies to the AUSF with "Naanf_AKMA_Register Response".

In this embodiment of this application, in an AKMA procedure, the AUSF may obtain the RID from the UDM, the UDM includes the RID in an existing authentication vector get response message, to ensure that the AUSF can generate, when the authentication vector get request message received by the AUSF carries the SUPI, a new A-KID by using the RID, thereby ensuring that the AKMA procedure is successfully performed.

The foregoing mainly describes the solutions provided in embodiments of this application from the perspective of the methods. It may be understood that, to implement the foregoing functions, a communication apparatus includes corresponding hardware structures and/or software modules for performing the functions. A person of ordinary skill in the art should easily be aware that, in combination with the examples described in embodiments disclosed in this specification, modules, algorithms and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method examples. For example, each functional module may be obtained through division based on each function, or two or more functions may be integrated into one processing module. The integrated module may be implemented in a form of hardware, or may be implemented in a form of a software functional module. It should be noted that, in embodiments of this application, module division is an example, and is merely logical function division. In an actual implementation, another division manner may be used.

Figure 9:
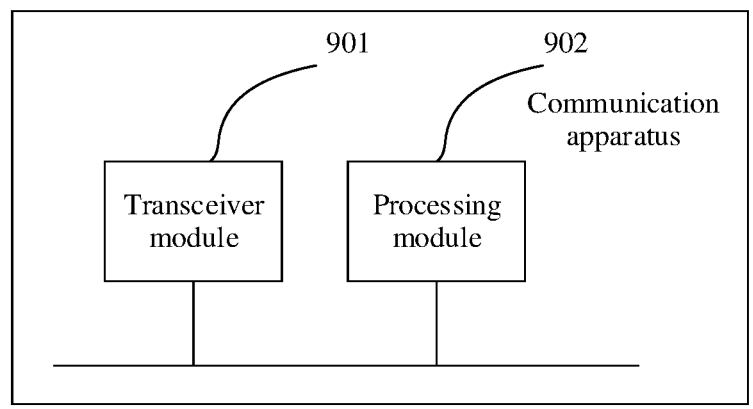
FIG. 9 is a schematic diagram of an embodiment of a communication apparatus according to an embodiment of this application.

The following describes in detail a communication apparatus in this application. FIG. 9 is a schematic diagram of an embodiment of the communication apparatus according to embodiments of this application. The communication apparatus may be deployed in a network device. The communication apparatus includes:

a transceiver module 901, configured to receive an authentication request message #1 from an access and mobility management function, where the authentication request message #1 carries a subscription concealed identifier, and the subscription concealed identifier is a subscription concealed identifier generated based on a permanent identifier of a terminal device, where the transceiver module 901 is further configured to send an authentication vector get request message #1 to a unified data management function, where the authentication vector get request message #1 carries the subscription concealed identifier; and the transceiver module 901 is further configured to receive an authentication vector get response message #1 from the unified data management function, where the authentication vector get response message #1 includes indication information of authentication and key management for application; and a processing module 902, configured to generate, based on the indication information of authentication and key management for application, an authentication and key management for application-key identifier #1 based on a routing indicator in the subscription concealed identifier, where the processing module 902 is further configured to store the routing indicator.

In a possible implementation, the transceiver module 901 is further configured to receive an authentication request message #2 from the access and mobility management function.

The processing module 902 is further configured to: when the authentication request message #2 carries the permanent identifier, generate a new authentication and key management for application-key identifier #2 by using the stored routing indicator.

In a possible implementation, the processing module 902 is further configured to generate an authentication and key management for application-key identifier based on an intermediate key generated in an authentication procedure for the terminal device.

The processing module 902 is further configured to splice the routing indicator and the authentication and key management for application-key identifier, to obtain the authentication and key management for application-key identifier #1.

In a possible implementation, the processing module 902 is further configured to store the authentication and key management for application-key identifier #1.

In a possible implementation, the authentication vector get response message #1 further includes the routing indicator.

That the processing module 902 is further configured to generate the authentication and key management for application-key identifier #1 based on the routing indicator in the subscription concealed identifier includes:

the processing module 902 is further configured to generate the authentication and key management for application-key identifier #1 based on the routing indicator in the authentication vector get response message #1.

In a possible implementation, the processing module 902 is further configured to store the subscription concealed identifier.

In a possible implementation, the processing module 902 is further configured to delete the authentication and key management for application-key identifier #1.

In a possible implementation, the processing module 902 is further configured to delete the authentication and key management for application-key identifier #2.

The processing module 902 is further configured to continue to store the routing indicator.

Figure 10:
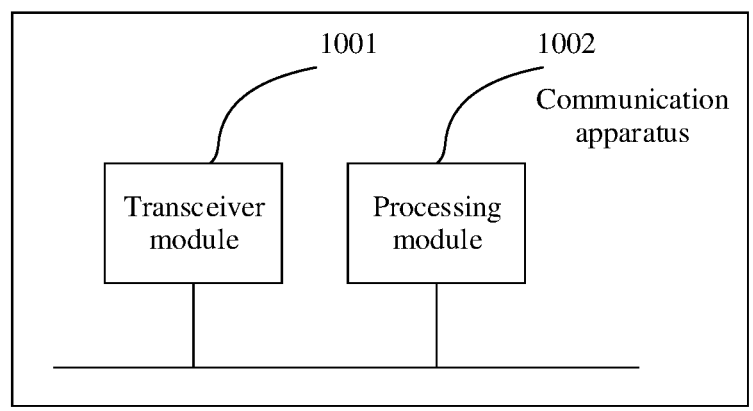

FIG. 10 is a schematic diagram of an embodiment of a communication apparatus according to an embodiment of this application. The communication apparatus may be deployed in a network device. The communication apparatus includes:

a transceiver module 1001, configured to receive an authentication request message #1 from an access and mobility management function, where the authentication request message #1 carries a subscription concealed identifier, and the subscription concealed identifier is a subscription concealed identifier generated based on a permanent identifier of a terminal device, where the transceiver module 1001 is further configured to send an authentication vector get request message #1 to a unified data management function, where the authentication vector get request message #1 carries the subscription concealed identifier; and the transceiver module 1001 is further configured to receive an authentication vector get response message #1 from the unified data management function, where the authentication vector get response message #1 includes indication information of authentication and key management for application and a routing indicator in the subscription concealed identifier; and a processing module 1002, configured to generate, based on the indication information of authentication and key management for application, an authentication and key management for application-key identifier #1 based on the routing indicator.

In a possible implementation, the transceiver module 1001 is further configured to receive an authentication request message #2 from the access and mobility management function. The authentication request message #2 includes the permanent identifier.

The transceiver module 1001 is further configured to send an authentication vector get request message #2 to the unified data management function. The authentication vector get request message #2 carries the permanent identifier.

The transceiver module 1001 is further configured to receive an authentication vector get response message #2 from the unified data management function. The authentication vector get response message #2 includes the routing indicator.

The processing module 1002 is further configured to generate a new authentication and key management for application-key identifier #2 by using the routing indicator.

In a possible implementation, the transceiver module 1001 is further configured to receive an authentication request message #2 from the access and mobility management function. The authentication request message #2 includes the permanent identifier.

The transceiver module 1001 is further configured to send an authentication vector get request message #2 to the unified data management function. The authentication vector get request message #2 carries the permanent identifier.

The transceiver module 1001 is further configured to obtain the routing indicator from a core network element based on the indication information of authentication and key management for application.

The processing module 1002 is further configured to generate a new authentication and key management for application-key identifier #2 by using the routing indicator.

In a possible implementation, the processing module 1002 is further configured to determine, based on the indication information of authentication and key management for application, that the authentication and key management for application-key identifier #2 needs to be generated.

The transceiver module 1001 is further configured to: when the authentication management function does not have the routing indicator locally, obtain the routing indicator from the core network element.

In a possible implementation, the core network element includes the unified data management function or the access and mobility management function.

In a possible implementation, the transceiver module 1001 is further configured to receive an authentication vector get response message #2 from the unified data management function. The authentication vector get response message #2 includes the indication information of authentication and key management for application.

Figure 11:
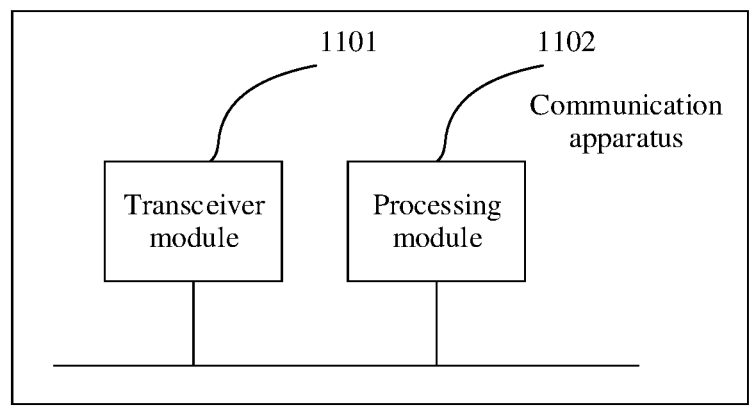
FIG. 11 is a schematic diagram of an embodiment of a communication apparatus according to an embodiment of this application.

FIG. 11 is a schematic diagram of an embodiment of a communication apparatus according to an embodiment of this application. The communication apparatus may be deployed in a network device. The communication apparatus includes:

- a transceiver module 1101, configured to receive an authentication request message #1 from an access and mobility management function, where the authentication request message #1 carries a subscription concealed identifier, and the subscription concealed identifier is a subscription concealed identifier generated based on a permanent identifier of a terminal device, where

- the transceiver module 1101 is further configured to send an authentication vector get request message #1 to a unified data management function, where the authentication vector get request message #1 carries the subscription concealed identifier; and

- the transceiver module 1101 is further configured to receive an authentication vector get response message #1 from the unified data management function, where the authentication vector get response message #1 includes indication information of authentication and key management for application; and

- a processing module 1102, configured to generate, based on the indication information of authentication and key management for application, an authentication and key management for application-key identifier #1 based on a routing indicator in the subscription concealed identifier, where

- the transceiver module 1101 is further configured to receive an authentication request message #2 from the access and mobility management function, where the authentication request message #2 includes the permanent identifier and the routing indicator; and

- the processing module 1102 is further configured to generate a new authentication and key management for application-key identifier #2 by using the routing indicator received from the access and mobility management function.

In a possible implementation, the transceiver module 1101 is further configured to send an authentication vector get request message #2 to the unified data management function. The authentication vector get request message #2 carries the permanent identifier.

The transceiver module 1101 is further configured to receive an authentication vector get response message #2 from the unified data management function.

In a possible implementation, the transceiver module 1101 is further configured to send a first authentication request response to the access and mobility management function. The first authentication request response includes first indication information, and the first indication information indicates that the terminal device supports an authentication and key management for application service.

In a possible implementation, the processing module 1102 is further configured to generate the authentication and key management for application-key identifier #1 based on the routing indicator in the authentication vector get response message #1.

Figure 12:
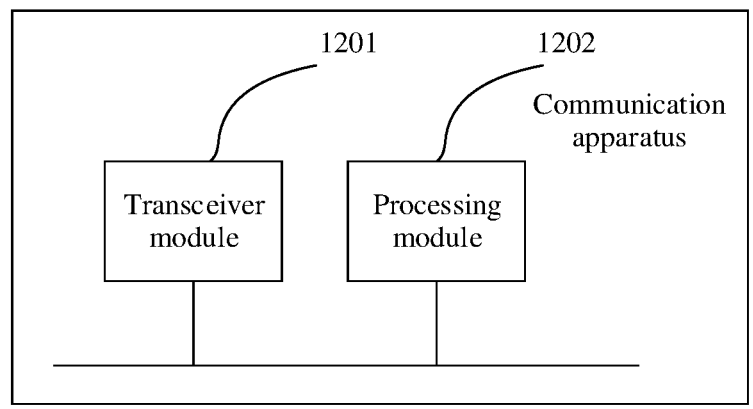
FIG. 12 is a schematic diagram of an embodiment of a communication apparatus according to an embodiment of this application.

FIG. 12 is a schematic diagram of an embodiment of a communication apparatus according to an embodiment of this application. The communication apparatus may be deployed in a network device. The communication apparatus includes:

- a transceiver module 1201, configured to receive an authentication request message #2 from an access and mobility management function, where the authentication request message #2 includes a permanent identifier, where

- the transceiver module 1201 is further configured to send an authentication vector get request message #2 to a unified data management function, where the authentication vector get request message #2 carries the permanent identifier; and

- the transceiver module 1201 is further configured to receive an authentication vector get response message #2 from the unified data management function, where the authentication vector get response message #2 includes indication information of authentication and key management for application; and

- a processing module 1202, further configured to determine, based on the indication information of authentication and key management for application, that an authentication and key management for application-key identifier needs to be generated, where

- the transceiver module 1201 is further configured to: when the authentication management function does not have a routing indicator locally, obtain the routing indicator from a core network element; and

- the processing module 1202 is further configured to generate an authentication and key management for application-key identifier #2 by using the routing indicator.

In a possible implementation, the core network element includes the unified data management function or the access and mobility management function.

Optionally, the communication apparatus may further include a storage unit. The storage unit is configured to store data and/or instructions (which may also be referred to as code or a program). The foregoing units may interact with or be coupled to the storage unit, to implement a corresponding method or function. For example, the processing module 1202 may read the data or the instructions in the storage unit, so that the communication apparatus implements the method in the foregoing embodiments. The coupling in this embodiment of this application may be an indirect coupling or a communication connection between apparatuses, units, or modules in an electrical form, a mechanical form, or another form, and is used for information exchange between the apparatuses, the units, or the modules.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

In an example, the unit in any one of the foregoing communication apparatuses may be one or more integrated circuits configured to implement the foregoing methods, for example, one or more application specific integrated circuits (application specific integrated circuits, ASICs), or one or more microprocessors (digital signal processors, DSPs), or one or more field programmable gate arrays (field programmable gate arrays, FPGAs), or a combination of at least two of these integrated circuit forms. For another example, when the units in the communication apparatus may be implemented in a form of scheduling a program by a processing element, the processing element may be a general-purpose processor, for example, a central processing unit (central processing unit, CPU) or another processor that can invoke the program. For still another example, the units may be integrated and implemented in a form of a system-on-a-chip (system-on-a-chip, SOC).

This application further provides a communication system, including at least one or more of a network device or a terminal device.

An embodiment of this application further provides a computer-readable storage medium, including instructions. When the instructions are run on a computer, the computer controls a network device or a terminal device to perform any implementation shown in the foregoing method embodiments.

An embodiment of this application further provides a computer program product. The computer program product includes computer program code. When the computer program code is run on a computer, the computer performs any implementation shown in the foregoing method embodiments.

An embodiment of this application further provides a chip system, including a memory and a processor. The memory is configured to store a computer program, and the processor is configured to invoke the computer program from the memory and run the computer program, so that a chip performs any implementation shown in the foregoing method embodiments.

An embodiment of this application further provides a chip system, including a processor. The processor is configured to invoke and run a computer program, so that a chip performs any implementation shown in the foregoing method embodiments.

All or a part of the technical solutions provided in embodiments of this application may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a dedicated computer, a computer network, an AI node, an access network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

In embodiments of this application, when there is no logical conflict, embodiments may be mutually referenced. For example, methods and/or terms in the method embodiments may be mutually referenced, and functions and/or terms in the apparatus embodiments may be mutually referenced. For example, functions and/or terms between the apparatus embodiments and the method embodiments may be mutually referenced.

It is clearly that, a person skilled in the art can make various modifications and variations to this application without departing from the scope of this application. This application is intended to cover these modifications and variations of this application provided that they fall within the scope of protection defined by the claims of this application and their equivalent technologies.

What is claimed is:

1. A key identifier generation method, comprising:
receiving, by an authentication management function, a first authentication request message from an access and mobility management function, wherein the first authentication request message carries a subscription concealed identifier, and the subscription concealed identifier is generated based on a permanent identifier of a terminal device;
sending, by the authentication management function, a first authentication vector get request message to a unified data management function, wherein the first authentication vector get request message carries the subscription concealed identifier;
receiving, by the authentication management function, a first authentication vector get response message from the unified data management function, wherein the first authentication vector get response message comprises indication information of authentication and key management for application, and further comprises a routing indicator that is determined based on the subscription concealed identifier; and
generating, by the authentication management function based on the routing indicator and the indication information of authentication and key management for application, a first authentication and key management for application-key identifier.

2. The method according to claim 1, further comprising:
receiving, by the authentication management function, a second authentication request message from the access and mobility management function, wherein the second authentication request message comprises the permanent identifier;
sending, by the authentication management function, a second authentication vector get request message to the unified data management function, wherein the second authentication vector get request message carries the permanent identifier;
receiving, by the authentication management function, a second authentication vector get response message the unified data management function, wherein the second authentication vector get response message comprises the routing indicator and the indication information of authentication and key management for application; and generating, by the authentication management function, a new second authentication and key management for application-key identifier using the routing indicator.

3. The method according to claim 1, further comprising:
receiving, by the authentication management function, a second authentication request message from the access and mobility management function, wherein the second authentication request message comprises the permanent identifier;
sending, by the authentication management function, a second authentication vector get request message to the unified data management function, wherein the second authentication vector get request message carries the permanent identifier;
obtaining, by the authentication management function, the routing indicator from a core network element based on the indication information of authentication and key management for application; and
generating, by the authentication management function, a new second authentication and key management for application-key identifier using the routing indicator.

4. The method according to claim 3, wherein obtaining, by the authentication management function, the routing indicator from the core network element based on the indication information of authentication and key management for application comprises:
determining, by the authentication management function based on the indication information of authentication and key management for application, that the second authentication and key management for application-key identifier needs to will be generated; and
when the authentication management function does not have the routing indicator locally when it is determined that the second authentication and key management for application-key identifier will be generated, obtaining, by the authentication management function, the routing indicator from the core network element.

5. The method according to claim 3, wherein the core network element comprises the unified data management function or the access and mobility management function.

6. The method according to claim 3, wherein before obtaining, by the authentication management function, the routing indicator from the core network element based on the indication information of authentication and key management for application, the method further comprises:
receiving, by the authentication management function, a second authentication vector get response message from the unified data management function, wherein the second authentication vector get response message comprises the indication information of authentication and key management for application.

7. A method, comprising:
receiving, by a unified data management function, a first authentication vector get request message from an authentication management function, wherein the first authentication vector get request message carries a subscription concealed identifier;
determining, by the unified data management function, a routing indicator based on the subscription concealed identifier; and
sending, by the unified data management function, a first authentication vector get response message to the authentication management function, wherein the first authentication vector get response message comprises the routing indicator and indication information of authentication and key management for application.

8. The method according to claim 7, further comprising:
receiving, by the unified data management function, a second authentication vector get request message from the authentication management function, wherein the second authentication vector get request message carries a permanent identifier of a terminal device;
determining, by the unified data management function, the routing indicator based on the permanent identifier; and
sending, by the unified data management function, a second authentication vector get response message to the authentication management function, wherein the second authentication vector get response message comprises the routing indicator and the indication information of authentication and key management for application.

9. The method according to claim 7, wherein after determining, by the unified data management function, the routing indicator based on the subscription concealed identifier, the method further comprises:
storing, by the unified data management function, the routing indicator.

10. The method according to claim 7, further comprising:
determining, by the unified data management function, a terminal device corresponding to the subscription concealed identifier supports a service of authentication and key management for application.

11. An apparatus, comprising:
at least one processor coupled to at least one memory storing instructions, wherein the at least one processor is configured to execute the instructions to cause the apparatus to:
receive a first authentication request message from an access and mobility management function, wherein the first authentication request message carries a subscription concealed identifier, and the subscription concealed identifier is generated based on a permanent identifier of a terminal device;
send a first authentication vector get request message to a unified data management function, wherein the first authentication vector get request message carries the subscription concealed identifier;
receive a first authentication vector get response message from the unified data management function, wherein the first authentication vector get response message comprises indication information of authentication and key management for application, and further comprises a routing indicator that is determined based on the subscription concealed identifier; and
generate, based on the routing indicator and the indication information of authentication and key management for application, a first authentication and key management for application-key identifier.

12. The apparatus according to claim 11, wherein the at least one processor is configured to execute the instructions to cause the apparatus further to:
receive a second authentication request message from the access and mobility management function, wherein the second authentication request message comprises the permanent identifier;
send a second authentication vector get request message to the unified data management function, wherein the second authentication vector get request message carries the permanent identifier;
receive a second authentication vector get response message from the unified data management function, wherein the second authentication vector get response message comprises the routing indicator and the indication information of authentication and key management for application; and generate a new second authentication and key management for application-key identifier by using the routing indicator.

13. The apparatus according to claim 11, wherein the at least one processor is configured to execute the instructions to cause the apparatus further to:

receive a second authentication request message from the access and mobility management function, wherein the second authentication request message 0 comprises the permanent identifier;

send a second authentication vector get request message to the unified data management function, wherein the second authentication vector get request message carries the permanent identifier;

obtain the routing indicator from a core network element based on the indication information of authentication and key management for application; and generate a new second authentication and key management for application-key identifier by using the routing indicator.

14. The apparatus according to claim 13, wherein obtaining the routing indicator from the core network element based on the indication information of authentication and key management for application comprises:

determining, based on the indication information of authentication and key management for application, that the second authentication and key management for application-key identifier will be generated; and when the apparatus does not have the routing indicator locally when it is determined that the second authentication and key management for application-key identifier will be generated, obtaining the routing indicator from the core network element.

15. The apparatus according to claim 13, wherein the core network element comprises the unified data management function or the access and mobility management function.

16. The apparatus according to claim 13, wherein the at least one processor is configured to execute the instructions to cause the apparatus further to:

before obtaining the routing indicator from the core network element based on the indication information of authentication and key management for application, receive a second authentication vector get response message from the unified data management function, wherein the second authentication vector get response message comprises the indication information of authentication and key management for application.

17. An apparatus, comprising:

at least one processor coupled to at least one memory storing instructions, wherein the at least one processor is configured to execute the instructions to cause the apparatus to:

receive a first authentication vector get request message from an authentication management function, wherein the first authentication vector get request message carries a subscription concealed identifier;

determine a routing indicator based on the subscription concealed identifier; and send a first authentication vector get response message to the authentication management function, wherein the first authentication vector get response message comprises the routing indicator, and indication information of authentication and key management for application.

18. The apparatus according to claim 17, wherein the at least one processor is configured to execute the instructions to cause the apparatus further to:

receive a second authentication vector get request message from the authentication management function, wherein the second authentication vector get request message carries a permanent identifier of a terminal device;

determine the routing indicator based on the permanent identifier; and send a second authentication vector get response message to the authentication management function, wherein the second authentication vector get response message comprises the routing indicator, and the indication information of authentication and key management for application.

19. The apparatus according to claim 17, wherein the at least one processor is configured to execute the instructions to cause the apparatus further to:

after determining the routing indicator based on the subscription concealed identifier, store the routing indicator.

20. The apparatus according to claim 17, wherein the at least one processor is configured to execute the instructions to cause the apparatus further to:

determine a terminal device corresponding to the subscription concealed identifier supports a service of authentication and key management for application.

* * * * *

UNITED STATES PATENT AND TRADEMARK OFFICE
CERTIFICATE OF CORRECTION

PATENT NO. : 12,375,909 B2
APPLICATION NO. : 18/348834
DATED : July 29, 2025
INVENTOR(S) : Li et al.

Page 1 of 1

It is certified that error appears in the above-identified patent and that said Letters Patent is hereby corrected as shown below:

In the Claims

In Column 46, in Claim 2, Line 62, after "message" insert -- from --.

In Column 47, in Claim 4, Line 32, after "identifier" delete "needs to".

In Column 49, in Claim 13, Line 12, after "message" delete "0".

Signed and Sealed this
Second Day of September, 2025

Coke Morgan Stewart
*Acting Director of the United States Patent and Trademark Office*